United States Patent
West

(10) Patent No.: US 12,099,886 B2
(45) Date of Patent: Sep. 24, 2024

(54) TECHNIQUES FOR PERFORMING CLIPBOARD-TO-FILE PASTE OPERATIONS

(71) Applicant: Dropbox, Inc., San Francisco, CA (US)

(72) Inventor: Zachary West, San Francisco, WA (US)

(73) Assignee: Dropbox, Inc., San Francisco, CA (US)

( * ) Notice: Subject to any disclaimer, the term of this patent is extended or adjusted under 35 U.S.C. 154(b) by 45 days.

(21) Appl. No.: 17/491,073

(22) Filed: Sep. 30, 2021

(65) Prior Publication Data

US 2023/0101774 A1    Mar. 30, 2023

(51) Int. Cl.
*G06F 9/54* (2006.01)
*G06F 3/0484* (2022.01)
*G06F 9/451* (2018.01)
*G06F 16/11* (2019.01)

(52) U.S. Cl.
CPC ............ *G06F 9/543* (2013.01); *G06F 3/0484* (2013.01); *G06F 9/451* (2018.02); *G06F 16/116* (2019.01)

(58) Field of Classification Search
CPC ........ G06F 16/116; G06F 9/543; G06F 9/451; G06F 3/0484
See application file for complete search history.

(56) References Cited

U.S. PATENT DOCUMENTS

| | | | |
|---|---|---|---|
| 7,818,458 B2 | 10/2010 | Andersen | |
| 8,555,187 B2 | 10/2013 | Margolin | |
| 9,158,436 B2 | 10/2015 | Varenhorst et al. | |
| 9,495,410 B1 | 11/2016 | Bhudavaram et al. | |
| 9,647,991 B2 | 5/2017 | Dowd et al. | |
| 10,042,680 B2 | 8/2018 | Major et al. | |
| 10,067,652 B2 | 9/2018 | Kleinpeter et al. | |
| 2006/0218492 A1* | 9/2006 | Andrade | G06F 40/166 715/234 |
| 2009/0276771 A1* | 11/2009 | Nickolov | G06Q 30/04 718/1 |
| 2014/0267339 A1 | 9/2014 | Dowd et al. | |

(Continued)

OTHER PUBLICATIONS

Files, "Uploading Files," Retrieved from https://www.files.com/docs/features/files, Sep. 18, 2021, 8 pages.

(Continued)

*Primary Examiner* — Andrea C Leggett
(74) *Attorney, Agent, or Firm* — Polsinelli PC

(57) ABSTRACT

Techniques are provided to enable paste operations to directly create files, of an appropriate file type, within a file system based on non-file content items contained in a clipboard at the time of the paste operation. In addition to clipboard-to-file paste operations that create a single file based on a single non-file content item in the clipboard, techniques are described herein for performing one-to-many clipboard-to-file paste operations. In one-to-many clipboard-to-file paste operations, multiple files are created, in different file formats, for the same non-file content item, in response to a single clipboard-to-file paste operation. Techniques are also provided for many-to-many clipboard-to-file paste operations, where a single paste operation creates files for multiple distinct non-file content items identified within the buffered-content-data. Thus, a single clipboard-to-file paste operation may result in creation of files for two different images, a text file, and a shortcut file.

20 Claims, 16 Drawing Sheets

(56) References Cited

U.S. PATENT DOCUMENTS

2015/0012861 A1* 1/2015 Loginov ................. G06F 9/543
 715/770
2015/0370764 A1* 12/2015 Huo ......................... G06F 9/44
 715/239
2017/0063962 A1 3/2017 Padmanabhan et al.
2022/0083675 A1* 3/2022 Zargarian ............. G06F 21/606

OTHER PUBLICATIONS

Ping L. J., "Design and Implementation of Virtually Shared Homescreen System for Android Smart Phone," Sep. 2014, A project report submitted in partial fulfillment of the requirements for the award of Bachelor of Engineering(Hons.) Electrical and Electronics Engineering, 237 pages.

* cited by examiner

TECHNIQUES FOR PERFORMING CLIPBOARD-TO-FILE PASTE OPERATIONS

FIELD OF THE INVENTION

The present invention relates to pasting non-file items from a clipboard and, more specifically, to performing clipboard-to-file paste operations of non-file content-items to create new files in a file system.

BACKGROUND

Many file systems provide user interfaces that support drag-and-drop and copy-and-paste operations to create new copies of one or more selected files. For example, a user may create copies of these files by:
  selecting representations of the files in a folder represented in a file-system user-interface,
  triggering a "copy" operation,
  using the file-system user-interface to navigate to a different folder, and then
  triggering a paste operation.

While such operations create new copies of entire existing files (or, in the case of cut-and-paste operations, move entire existing files from one location to another), a different mechanism must be used when the content being copied/moved is not already in the form of a file in a file system. An item that is not already in the form of a file in a file system is referred to herein as a "non-file content item".

Nearly all modern operating systems provide a mechanism through which non-file content items may be easily copied/moved within an application, or copied/moved from one application to another. Typically, use of the mechanism involves two operations: a "cut" or "copy" operation followed by a "paste" operation. The application in which the "cut" or "copy" operation is performed is referred to herein as the "source application". The application in which the "paste" operation is performed is referred to herein as the "target application". For intra-application non-file content item pastes, the source and target applications are the same. For inter-application pastes, the source application is different from the target application.

A "cut" operation causes selected non-file content item(s) to be deleted from its original location in the source application. A "copy" operation causes the selected non-file content item(s) to remain intact at their original location within the source application. Both "cut" and "copy" operations cause the source application to place buffered-content-data in an operating-system-provided buffer, commonly referred to as the "clipboard". As shall be described in greater detail hereafter, the buffered-content-data created by a cut/copy operation generally includes data that represents the selected non-file content item(s) as well as accompanying metadata.

When representations of non-file content items are placed in the clipboard in response to a copy/cut operation, the representations of those non-file content items, within the clipboard, are not themselves entire files. Thus, the cut/copy of a non-file content item results in creation of one or more corresponding non-file content items in the buffered-content-data within the clipboard. For example, a "copy" operation performed on an image of a webpage may cause three corresponding non-file content items to be placed in the clipboard. Each of the three non-file content items may be, for example, a representation of the image in a different image format.

After a cut/copy operation has been performed, a "paste" operation is performed in the desired target application. The paste operation causes content to be created in an in-memory container supported by the target application. The content created in the in-memory container is based on a representation of the non-file content item, which is obtained from the buffered-content-data that is currently in the clipboard. For the new content creation to be successful, the target application must support the type and format of the non-file content item that is represented in the buffered-content-data. For example, a simple text editor may be able to support a paste operation when the buffered-content-data represents textual information, but may be unable to support a paste operation when the buffered-content-data represents an image, an audio clip, or a video clip.

In response to a paste operation, the target application will typically paste a new non-file content item into an in-memory container that is currently open in the target application. Depending on the nature of the target application, the container into which the content is pasted may be a document, a video container, an audio container, etc. In some cases, if no in-memory container is currently opened in the target application, the target application may create a new in-memory container into which the clipboard content is pasted. For example, if the clipboard contains buffered-content-data that represents a digital image, the target application is a photo editor, and the photo editor does not have any in-memory image container open when the paste operation is initiated, the photo editor may create a new in-memory container and paste the image from the clipboard into the new in-memory container. Until the user of the target application performs a "save file" operation, the results of the paste operation will typically only be reflected in the in-memory version of the container, and not in any corresponding file in the file system.

Unfortunately, the current implementation of paste operations can be tedious when a user wants to create a new file that contains only a non-file content item represented in the buffered-content-data on the clipboard. For example, assume that a user wants to create a video file for each of two videos embedded in a web page within a browser. To create such video files, the user may:
  select one of the videos
  cause a "copy" operation to populate the clipboard with buffered-content-data that corresponds to the video
  open a target application that supports the pasting video data
  paste the video data from the clipboard into an empty container within the target application
  perform a "save file" operation, within the target application, to save the video as a file in a file system The same steps may then be repeated to create a second video file for the second video in the web page. As part of each "save file" operation, the user may have to select the file type, specify a file name, and select the location, within the file system, in which the new file is to be stored. Upon completion of the "save file" operation, the user will have the desired file.

Unfortunately, this sequence of operations only works if the user has access to a target application that (a) supports the desired paste operation (e.g. can handle the paste of video data), and (b) supports saving video data in the desired file format. For certain types of data, the user may not have a target application that supports the desired paste operation, or the desired format.

Even when the user has access to a target application that supports both (a) the desired paste operation and (b) saving to the desired file format, the user may not know it. The content types for which applications support paste operations is not always clear, nor are the file formats to which they may save/export. Further, when the user has access to several applications that support the desired paste operation and file format, it may not be clear which one to use.

Finally, even when the user knows which target application to use, the various steps involved in "save file" operations may be tedious. Thus, it is clearly desirable to provide a faster and easier way to create a file based on the non-file contents of a clipboard.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
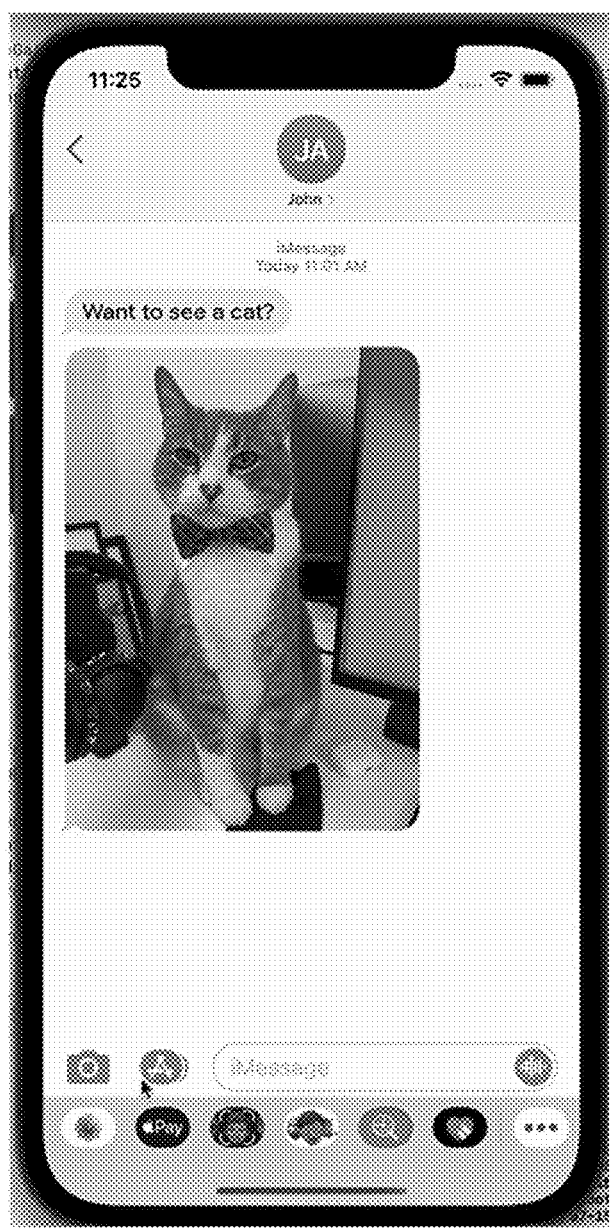
FIG. 1A illustrates a cat image in a messaging interface, according to some embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided to enable paste operations to directly create files, of an appropriate file type, within a file system based on non-file content items contained in a clipboard at the time of the paste operation. In particular, an application is provided in which a paste operation triggers:

analysis of the buffered-content-data to select a file type creation of a new file of that file type population of the new file based on the buffered-content-data currently contained in the clipboard Providing support for clipboard-to-file paste operations for non-file content items results in several advantages and technical effects. Specifically, the new technical solutions to the technical problem of creating files for non-file content items that have been copied into a clipboard result in significant efficiency improvements. For example, a user need not have to own an application that supports the pasting of a certain type of non-file content item (e.g. an image, video clip, or audio clip) in order to create files that contain that type of content. Further, even when the user has such an application, the techniques avoid the tedious and error prone manual steps of locating that application, causing creation of a new in-memory container in that application, pasting into the in-memory container, determining a filename, and storing the new in-memory container as a file in a selected location within a file system. Further, even those error prone manual steps may not produce the correct results when the clipboard contains multiple non-file content items, particularly if those non-file content items are of different types.

Various techniques involving clipboard-to-file paste operations shall now be described in greater detail.

One-to-One Clipboard-to-File Paste Operation Examples

A clipboard-to-file paste operation that creates a single file for a single item represented in the buffered-content-data is referred to herein as a one-to-one clipboard-to-file paste operation. As explained above, during a one-to-one clipboard-to-file paste operation, the target application responds to a paste operation activation by analyzing the buffered-content-data on the clipboard, determining the appropriate file format for a non-file content item represented by the buffered-content-data, creating a file of the appropriate format, and populating the file with non-file content item formatted according to the selected file format. FIGS. 1A-3C illustrate the user interface display during various one-to-one clipboard-to-file paste operations, according to one embodiment.

Figure 1B:
FIG. 1B illustrates selecting the cat image illustrated in FIG. 1A, and initiating a copy operation using a copy control, according to some embodiments.
Figure 1C:
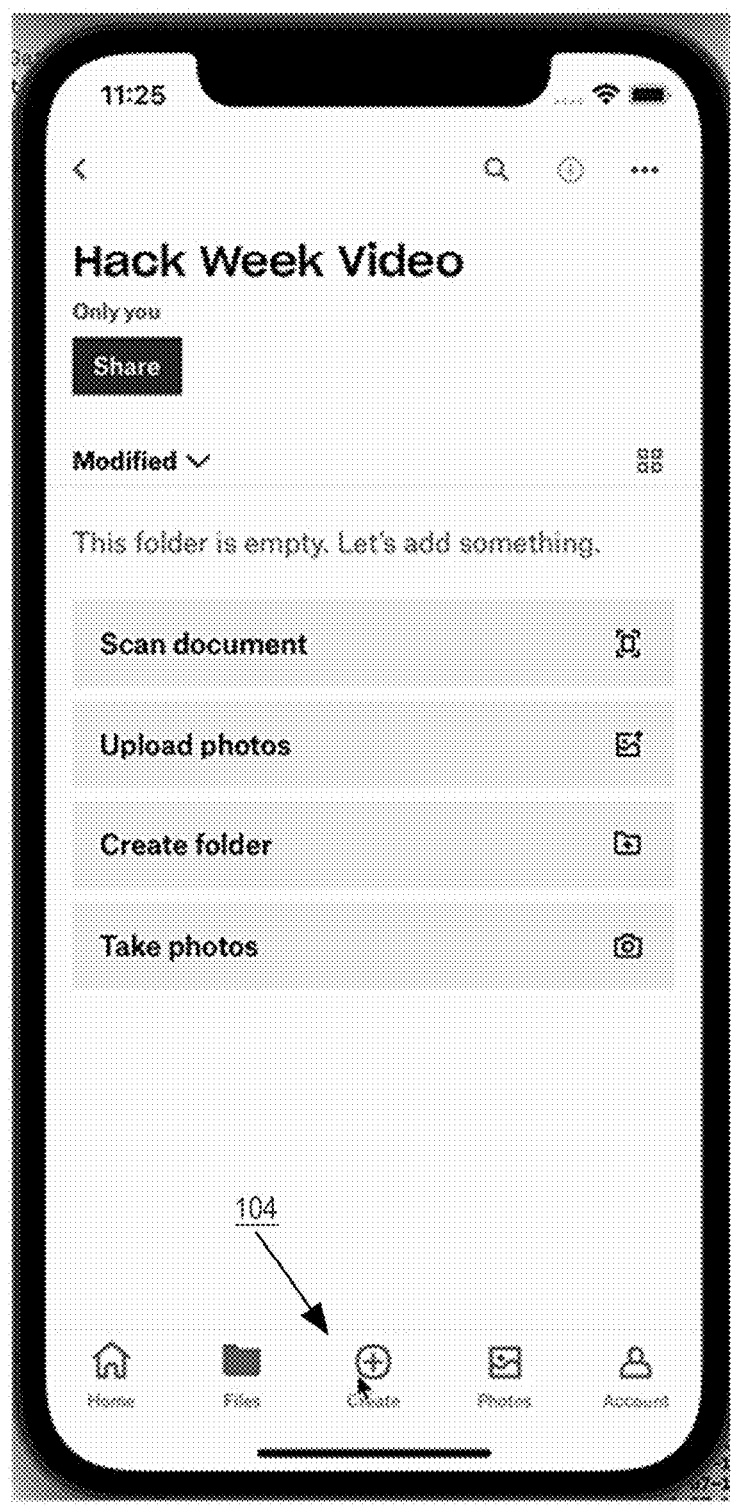
FIG. 1C illustrates a target application having a "create" control which, when selected, causes display of a control for initiating a clipboard-to-file copy operation, according to some embodiments.
Figure 1D:
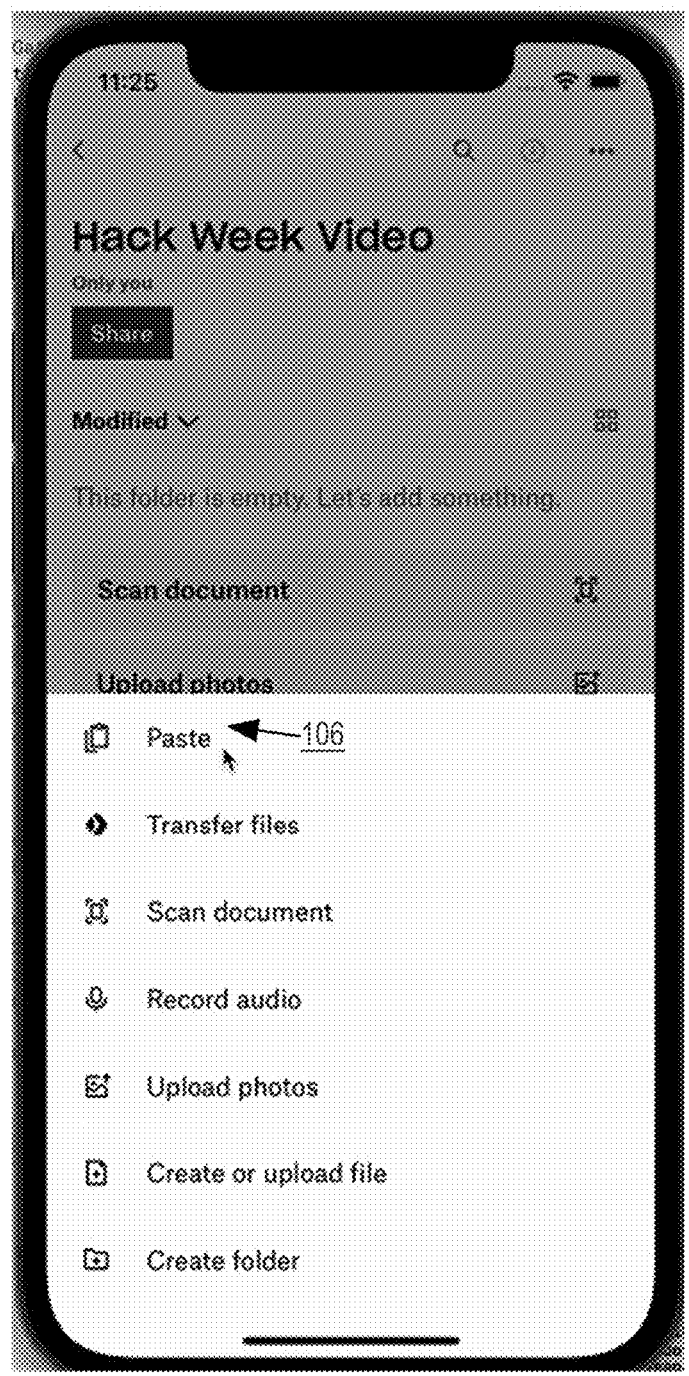
FIG. 1D illustrates selection of a clipboard-to-file paste control for initiating a clipboard-to-file paste operation, according to some embodiments.
Figure 1E:
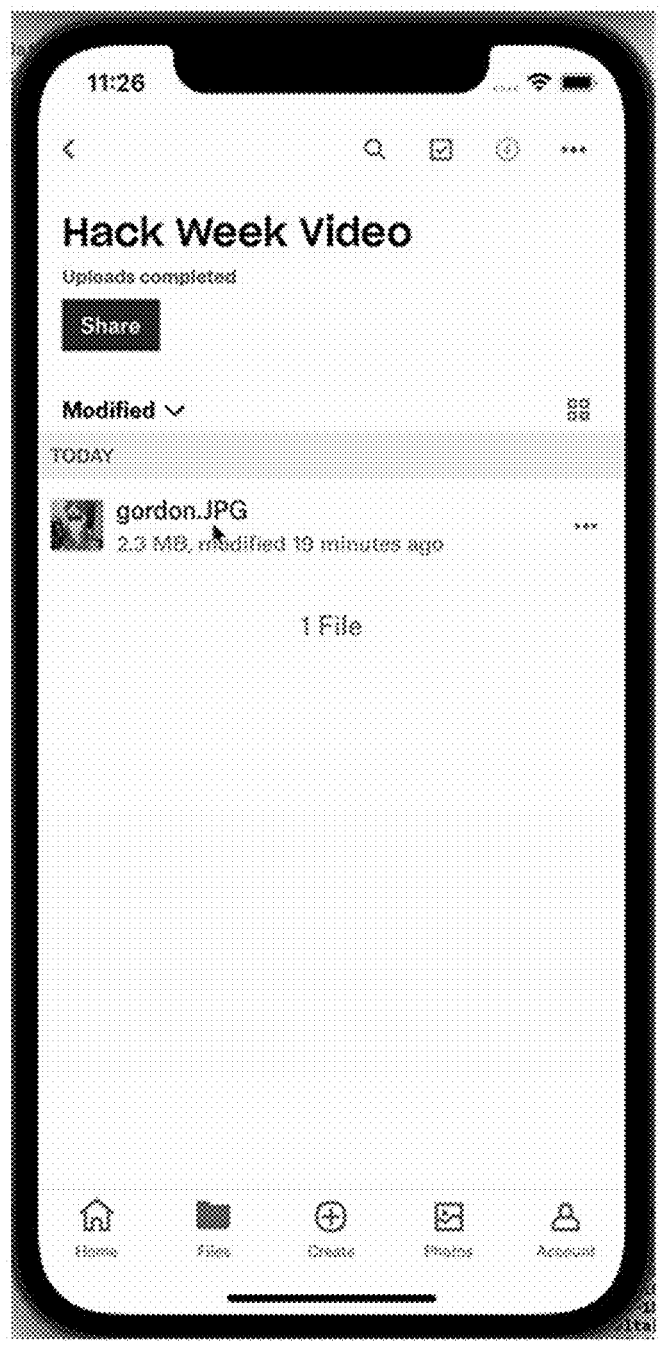
FIG. 1E illustrates how a new file may be created in a content management system in response to a clipboard-to-file paste operation performed when the clipboard contained the image of the cat, according to some embodiments.

Referring to FIGS. 1A-1E, they illustrate a sequence of user interface states that occur during a one-to-one clipboard-to-file paste operation involving an image of a cat, according to one embodiment. In FIG. 1A, the image is selected in the source application (in this case, a messaging application). In FIG. 1B, a copy operation action is performed in the source application by activating the copy control 102 while the image of the cat is selected. In response to performance of the copy operation, buffered-content-data that corresponds to the cat image is placed on the clipboard. In FIG. 1C, the user has switched to the target application. In the illustrated example, the user interface control for initiating a paste operation is displayed upon selection of the "create" control 104. FIG. 1D illustrates the user interface controls that appear upon selecting the "create" control 104, which include a "paste" control 106 for triggering a clipboard-to-file paste operation. FIG. 1E illustrates the user interface of the target application after performance of the clipboard-to-file paste operation. Specifically, FIG. 1E illustrates that the clipboard-to-file paste operation resulted in the creation of an image file, entitled "gordon.JPG", that conforms to the JPG format file standard and contains the image of the cat. In this case, the filename of the image file created in response to the clipboard-to-file paste operation was determined by the target application based on metadata contained in the buffered-content-data, which indicated that the copied image was entitled "gordon.JPG".

Figure 2A:
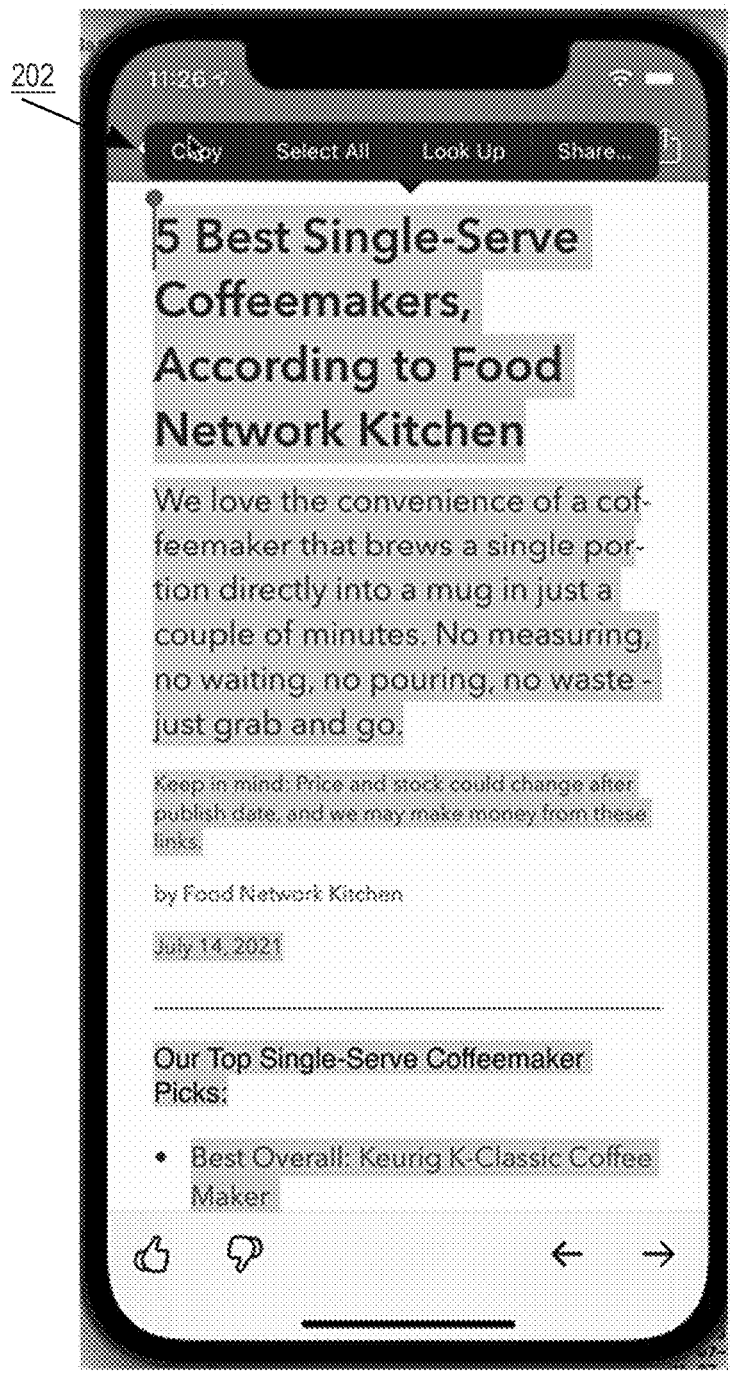
FIG. 2A illustrates selection of text of a webpage in a source application, according to some embodiments.
Figure 2B:
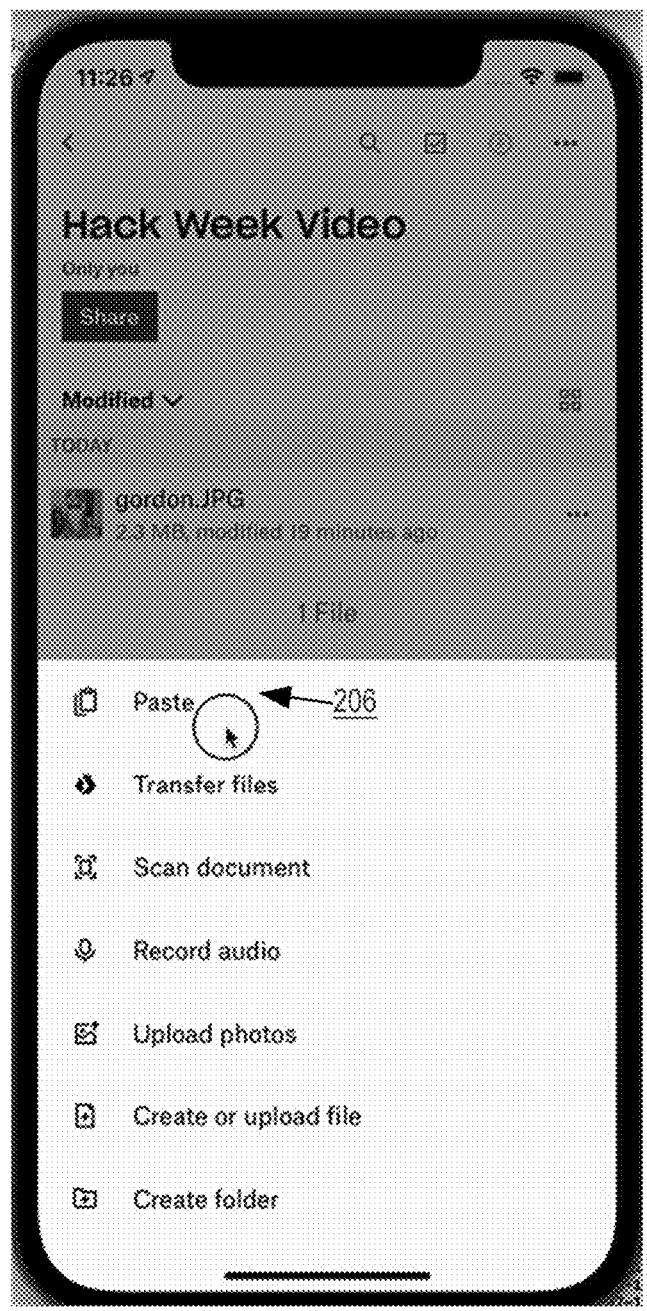
FIG. 2B illustrates selection, within a target application, of a clipboard-to-file paste control 206 to initiate a clipboard-to-file paste operation while the clipboard contains a representation of the text illustrated in FIG. 2A, according to some embodiments.
Figure 2C:
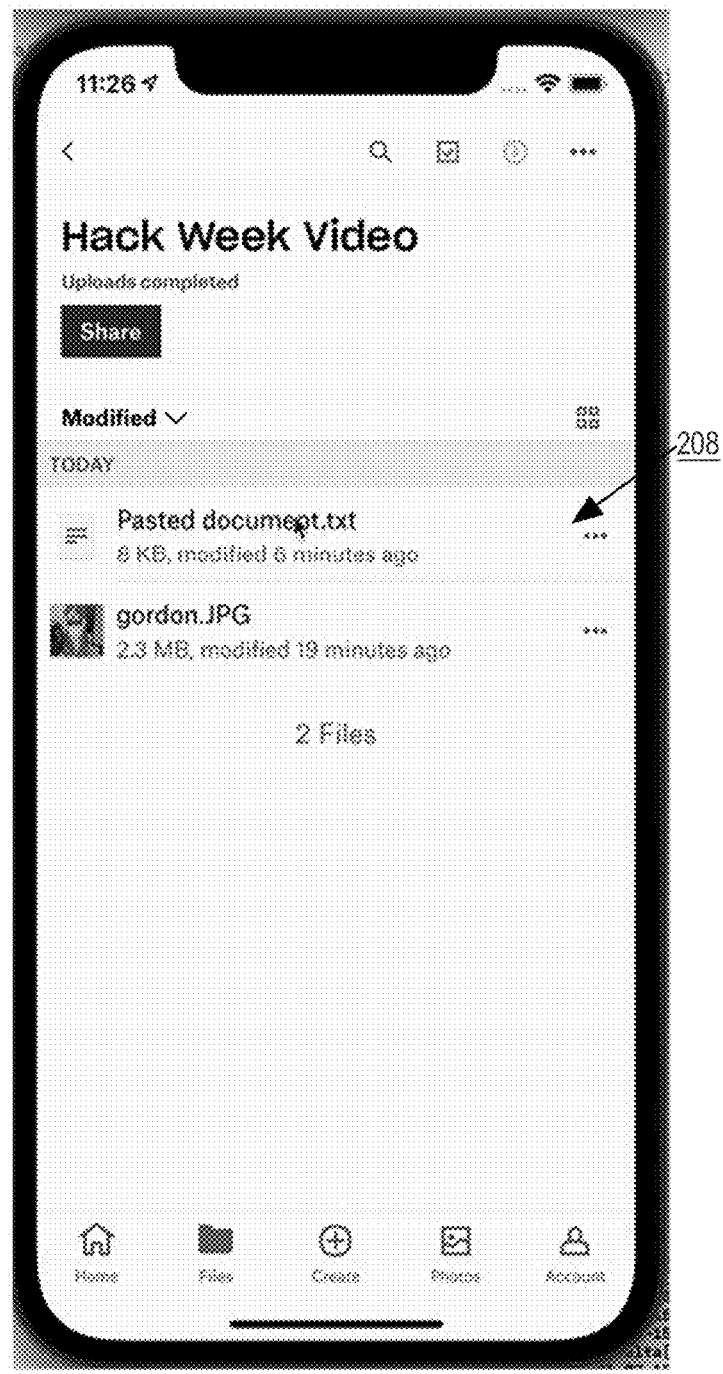
FIG. 2C illustrates how a new file may be created in a content management system in response to a clipboard-to-file paste operation performed when the clipboard contained the text illustrated in FIG. 2A, according to some embodiments.
Figure 2D:
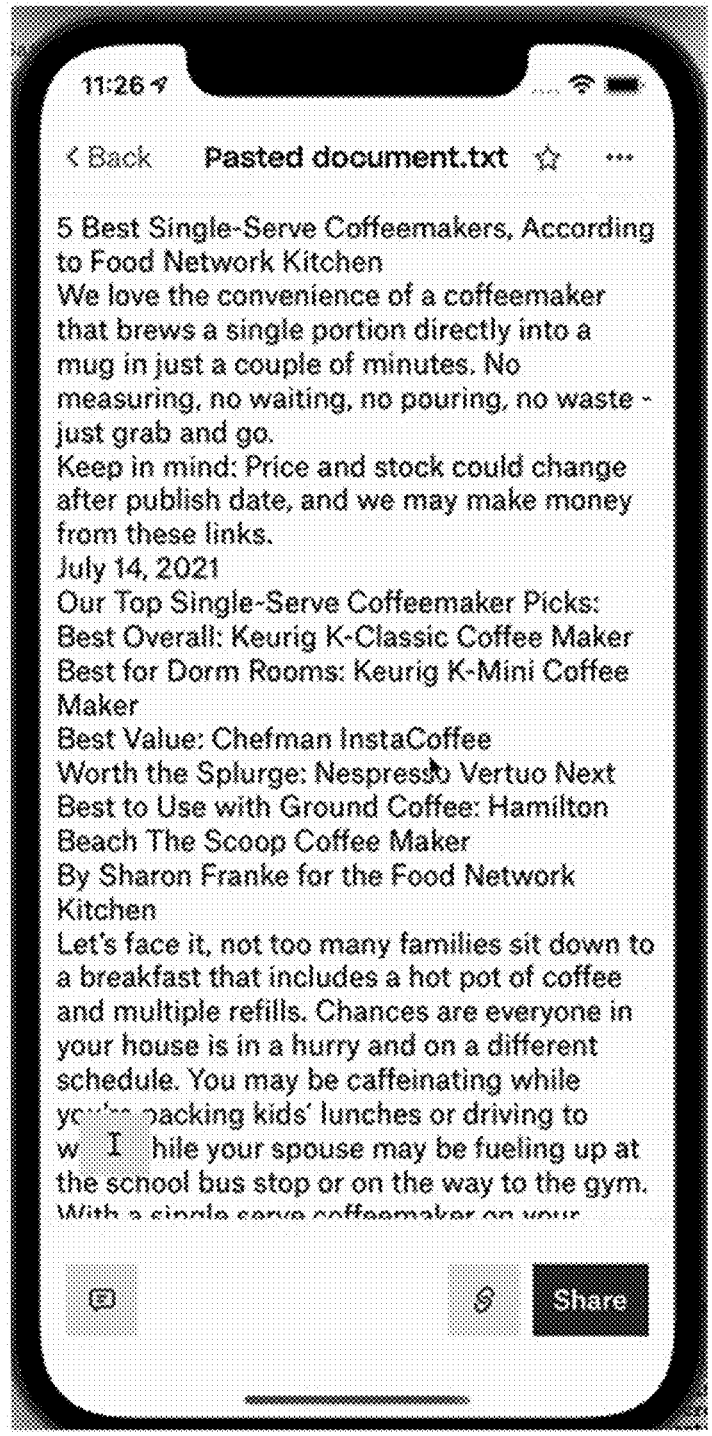
FIG. 2D illustrates textual content of the newly-created text file from FIG. 2C, according to some embodiments.

Referring to FIGS. 2A-2D, they illustrate a sequence of user interface states that occur during a one-to-one clipboard-to-file paste operation involving the text of a webpage, according to one embodiment. In FIG. 2A, the text is selected in the source application (in this case, a browser). After selecting the text, the user uses the copy control 202 of the source application to initiate a copy operation, causing buffered-content-data representing the selected text to be placed in the clipboard. In FIG. 2B, the user has switched to the target application and activated the "create" control to display the "paste" control 206. In response to activating the paste control 206, a clipboard-to-file paste operation is initiated during which the target application causes creation of a text file based on the buffered-content-data from the clipboard. As illustrated in FIG. 2C, the target application has created a new text file 208 with the name "pasted document.txt". FIG. 2D illustrates the content of that newly created text file.

Figure 3A:
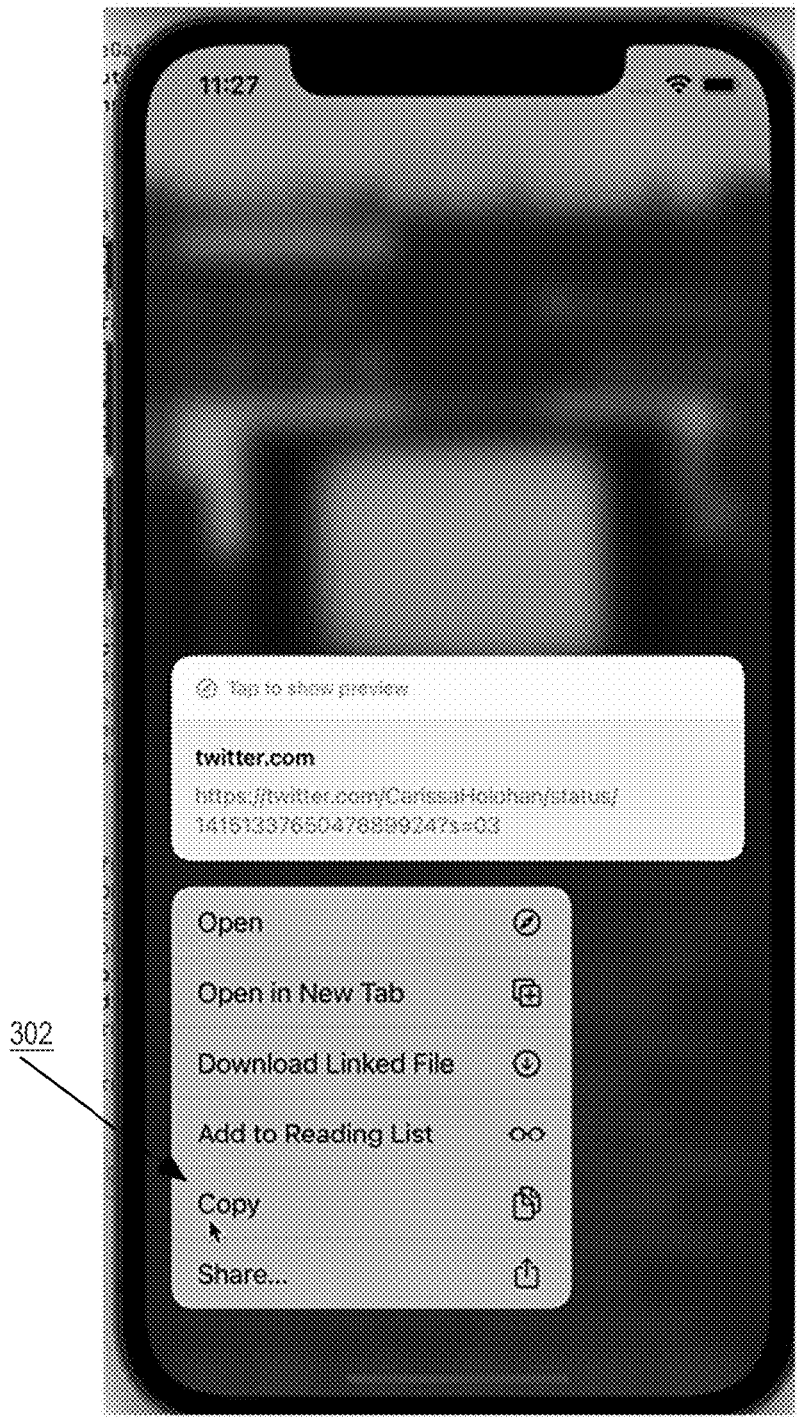
FIG. 3A illustrates copying, using a copy control, of a selected link in a source application, according to some embodiments.
Figure 3B:
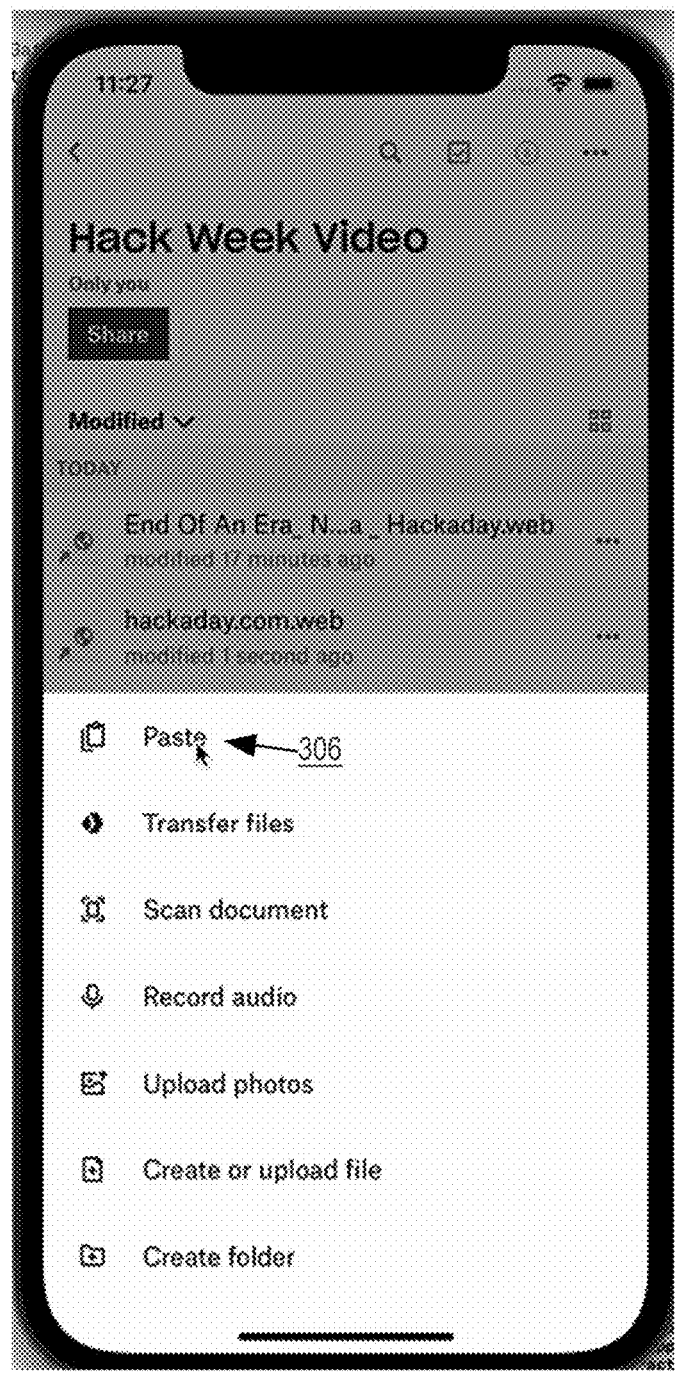
FIG. 3B illustrates selection, within a target application, of a clipboard-to-file paste control 306 to initiate a clipboard-to-file paste operation while the clipboard contains a representation of the link illustrated in FIG. 3A, according to some embodiments.
Figure 3C:
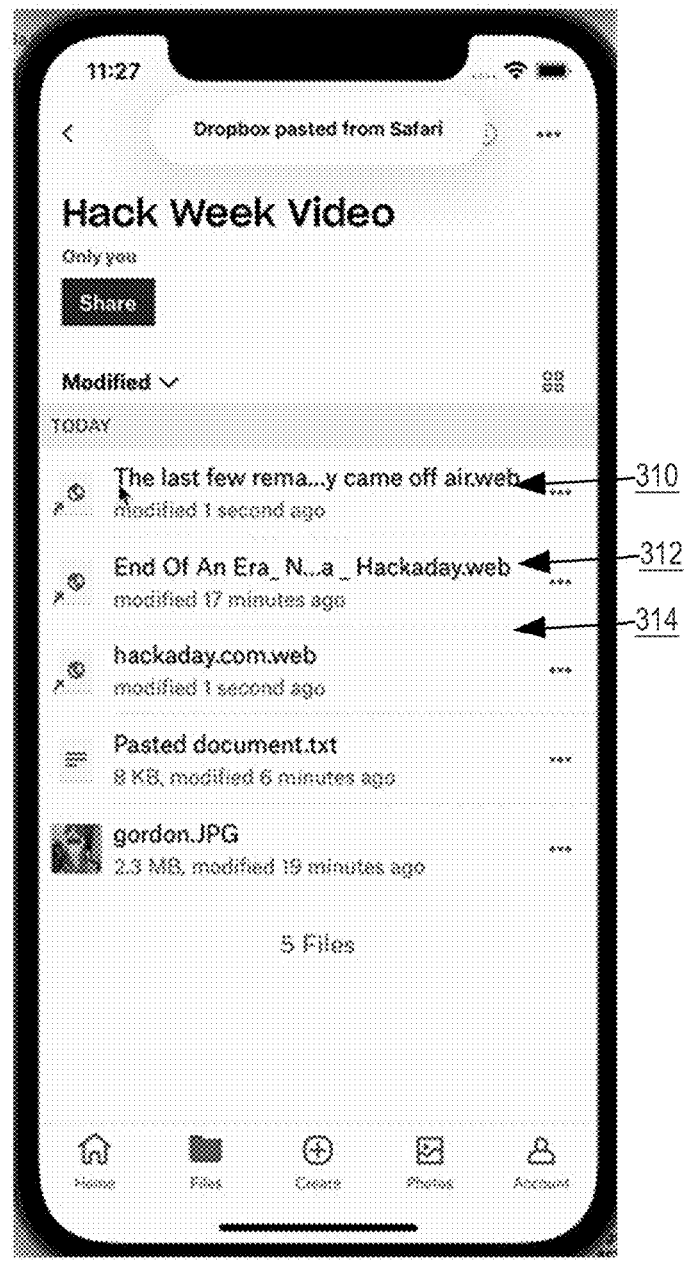
FIG. 3C illustrates shortcut files that have been created in response to clipboard-to-file paste operations performed while the clipboard contained links, according to some embodiments.

The type of file created in a clipboard-to-file paste operation is based on the nature of the non-file content item(s) in the buffered-content-data. FIGS. 3A-3C illustrate a situation where a clipboard-to-file paste operation is performed when a link is represented in the buffered-content-data. Referring to FIG. 3A, a link is copied into the clipboard using the copy control 302 of a source application. In FIG. 3B, the user selects the "paste" control 306 of the target application to initiate a clipboard-to-file paste operation. In response to activation of the paste control 306, the target application creates, within a file system, a shortcut file which, when activated, causes retrieval of the file associated with the copied link. One implementation of shortcut files is described in help.dropbox.com/files-folders/share/shortcuts, the content of which is incorporated herein by this reference. FIG. 3C illustrates that a shortcut file 310 was created in response to the activation of the paste control when the clipboard contained a link.

In addition to link 310, FIG. 3C illustrates two other shortcut files 312 and 314. Shortcut files 312 and 314 may have been created via previously-performed clipboard-to-file paste operations, and illustrate how the target application may employ various techniques for determining how to name shortcut files created in clipboard-to-file paste operations. For example, shortcut file 310 is named based on text that was associated with the link in the web page from which the link was copied. Shortcut file 312 is named based on a section heading in the web page from which the link was copied. Finally, Shortcut file 314 is named based simply on the text of the link itself. Techniques by which the target application may determine names for the files created in clipboard-to-file paste operations shall be described in greater detail hereafter.

General Flow of a Clipboard-to-File Paste Operation

Figure 4A:
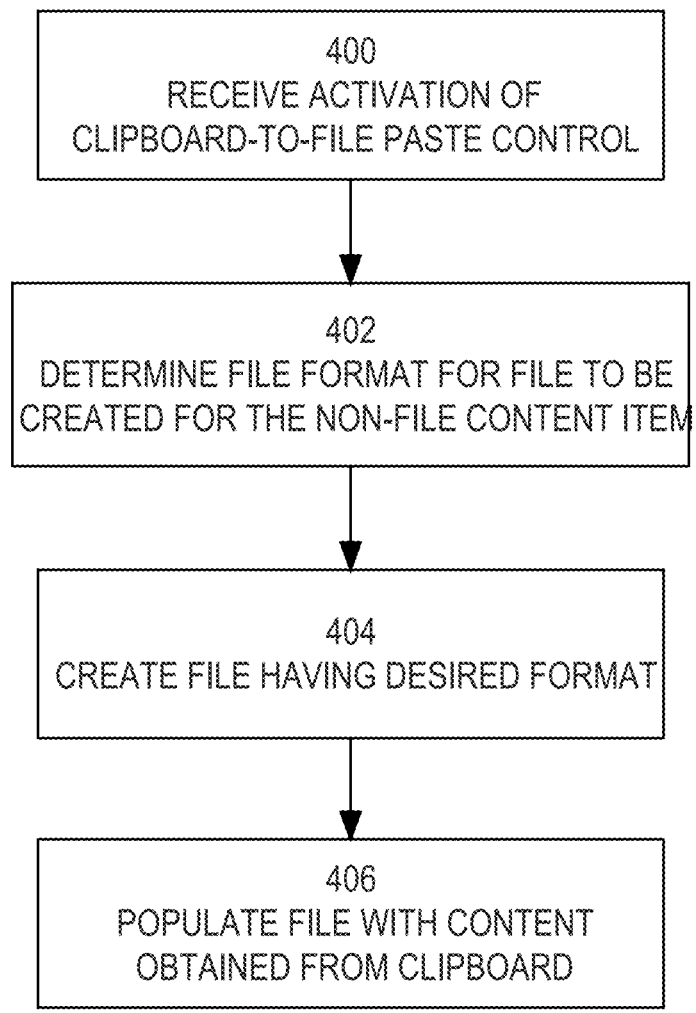
FIG. 4A is a flowchart illustrating general steps involved in a clipboard-to-file paste operation, according to some embodiments.

Referring to FIG. 4A, it is a flowchart illustrating steps performed by a target application in response to a clipboard-to-file paste operation, according to embodiments. Referring to FIG. 4A, at step 400, the target application receives activation of a clipboard-to-file paste control. For the purpose of illustration, it shall be assumed that, at the time the clipboard-to-file paste control was activated, the clipboard contents included a single non-file content item of text.

At step 402, the target application determines the file format of the file to create for the non-file content item. Various techniques for determining the appropriate file format for any given non-file content item are described in greater detail hereafter. In the present example, the file is being created for text copied into the clipboard, so the target application may determine that a text file should be created.

At step 404, the target application causes a file, having the desired format, to be created. In the present example, a text file would be created in step 404. As shall be described in greater detail hereafter, the target application may use various techniques to decide the name and location of the file that is created.

At step 406, the newly created file is populated with content, representing the non-file content item, obtained from the clipboard. In some embodiments, steps 404 and 406 may be combined by the target application creating an in-memory container for the non-file item, copying a representation of the non-file content item from the clipboard into the in-memory container, and then saving the container as a file having the desired file format.

Buffered-Content-Data

As explained above, when a copy or cut operation is performed in a source application, the operation causes buffered-content-data to be stored in an operating-system-provided buffer, commonly referred to as the "clipboard". The source application may, for example, make a call to the operating system to cause the buffered-content-data to be stored in the clipboard. The format of the buffered-content-data may vary based on a variety of factors, including the nature of the non-file content item(s) that are being copied/cut, and the operating system that is involved in the copy/cut operation. While embodiments shall be described hereafter in the context of the iOS operating system, the techniques are not limited to any particular operating system.

Information about the clipboard (also known as "pasteboard") provided by the iOS operating system is available at numerous sites, including webkit.org/blog/10855/async-clipboard-api/ and developer.apple.com/documentation/uikit/uipasteboard, the contents of which are incorporated herein by reference. In general, when copying data into the iOS clipboard in a source application, the source application may copy several versions of data, each of which may conform to a different format. In addition, the source application may "tag" each version with metadata. The metadata associated with a version of a non-file content item may indicate, for example, the UTType of the data. UTTypes are described in detail at developer.apple.com/documentation/uniformtypeidentifiers/uttype, the contents of which is incorporated herein by this reference.

For example, assume that a source application performs a copy operation while certain text is currently selected in the source application. In response to the copy operation, the source application may place into the clipboard:
- a copy of the selected text in UTF8 plaintext format, tagged with "UTF8"
- a copy of the selected text in plaintext format, tagged with "plaintext"

In addition to metadata regarding the format of the versions, the buffered-content-data may include several other types of relevant metadata. For example, if the copied text is a password, the metadata may include password-specific type information, such as whether the password is a secured password, how long before the password expires, etc.

As another example, when a copy operation is performed by a browser, and the selected content is an image in a webpage, the copy operation may place in the clipboard:
- a version of the image in JPEG format
- a version of the image in raw data format
- a version of the data in PNG format, etc.

Each version of the image within the clipboard would be tagged with appropriate metadata, including metadata to indicate the format of the version.

In addition to storing multiple versions of a selected non-file content item and the corresponding metadata, the buffered-content-data may include any number of other forms of metadata. For example, when the source application is a browser, the browser may include in the buffered-content-data the link and/or title of the webpage from which the image was copied, and the name of the image file from which the image was retrieved.

Buffered-content-data that is placed in the clipboard in response to a copy operation may also include "garbage data". The garbage data may include useless information that may resemble non-file content items other than the non-file content item that was the target of the copy operation. Thus, it may be necessary for a target application to identify and disregard any such garbage data when responding to a paste command, whether the command is for a conventional paste operation or a clipboard-to-file paste operation.

One-to-Many Clipboard-to-File Paste Operations

In addition to one-to-one clipboard-to-file paste operations, techniques are described herein for performing one-to-many clipboard-to-file paste operations. In a one-to-many clipboard-to-file paste operations, multiple files are created based on a single non-file content item. For example, when the nature of a non-file content item in the buffered-content-data is such that the non-file content item can be represented in multiple file formats, the target application may respond to a clipboard-to-file paste operation by creating a separate file for each file format.

For example, if an image of a cat is copied into the clipboard, as illustrated in FIGS. 1A-1B, a subsequent clipboard-to-file paste operation (illustrated in FIGS. 1C-1D) may result in the creation of three image files within a file system, each of which has a distinct file format. In the present example, such a one-to-many clipboard-to-file paste operation may result in the creation of the three files: Gordon.jpg, Gordon.png, and Gordon.raw.

Different types of files may serve different purposes. Thus, as another example, assume the buffered-content-data includes a link to a webpage. In response to a clipboard-to-file paste operation, the target application may create the following three files:
- a text file containing the text of the link (for easily sending the link to others in a messaging application)
- a shortcut file based on the link (for easy retrieval of the current version of the web page corresponding to the link), and
- a pdf copy of the web page that corresponds to the link (which may be created, for example, using print-to-pdf technology, and may be useful for reading and marking up the webpage while offline).

Many-to-Many Clipboard-to-File Paste Operations

In addition to one-to-many clipboard-to-file paste operations, techniques are provided herein for many-to-many clipboard-to-file paste operations. In a many-to-many clipboard-to-file paste operation, several distinct non-file content items are identified within the buffered-content-data. For example, a user may have, in a single copy operation, selected two images and some text from a web page. Upon analyzing the buffered-content-data and its accompanying metadata, the target application may determine that the buffered-content-data has three distinct non-file content items. In response to a single clipboard-to-file paste operation, the target application creates one or more files for each of the non-file content items. Thus, a single copy (that includes two images and text) followed by a single clipboard-to-file paste operation may trigger the creation of three distinct files, one image file for each of the two images and one text files for the text.

For example, rather than simply select one image on a webpage displayed by a browser, a user may select three images as well as accompanying text. If a copy operation is performed while the three images and text are selected, the resulting buffered-content-data may include three versions of each image (and accompanying metadata), two versions of the text (and accompanying metadata), a copy of the link of the webpage from which the content was copied, the names of each of the images, etc.

According to one embodiment, when the buffered-content-data includes data for multiple non-file content items, performing a clipboard-to-file paste operation results in the creation of one or more files for each of the non-file content items represented in the buffered-content-data. For example, if a clipboard-to-file paste operation is performed while the buffered-content-data contains representations of three images, a text item, and a link, the target application may respond to the clipboard-to-file paste operation by creating five files, one image file for each image, one text file for the text, and one shortcut file which, when activated, causes retrieval and display of the webpage that corresponds to the link.

In an alternative embodiment, a many-to-many clipboard-to-file paste operation may include a one-to-many clipboard-to-file paste operation for one or more of the non-file content items represented in the buffered-content-data. Thus, in the example given above, the clipboard-to-file paste operation may produce eight files, two for each image (having different file formats), one for the text, and a shortcut file for the link.

Determining a File Type for the Content-Item(s) in the Buffered-Content-Data

As mentioned above, the buffered-content-data may represent the same non-file content item in multiple formats. In such a situation, a one-to-many clipboard-to-file paste operation may be performed to create files that correspond to each of the formats. After a one-to-many clipboard-to-file paste operation, a user may then determine which file format the user prefers, and delete the files that correspond to the other formats.

However, in many instances, it would be more convenient (and less wasteful of computing and storage resources) to create only one file, that has the desired format, for each distinct non-file content item. According to one embodiment, for each type of non-file content item (image, text, etc.), the target application may maintain an ordered list of formats, ordered from "most preferred" to "least preferred". When a clipboard-to-file paste operation is initiated, the target application inspects the buffered-content-data to determine a type of non-file content item represented, and then selects the highest-ranked format for that non-file content item that is available within the buffered-content-data. The target application then creates a file with a file format that corresponds to that format.

For example, assume that the ordered list of image formats is: JPG, PNG, RAW, where JPG is the most preferred format and RAW is the least preferred format. While a three-item image format preference list is discussed, the actual list of image formats will typically be significantly longer. In response to a clipboard-to-file paste operation, the target application may determine that an image is represented in the clipboard. The target application then determines whether the buffered-content-data has a JPG version of the image. If so, the target application requests the JPG version from the clipboard creates a JPG file based on the JPG version of the image.

If the buffered-content-data does not have a JPG version of the image, then the target application determines whether the buffered-content-data has a PNG version of the image. If so, the target application requests the PNG version from the clipboard and creates a PNG file based on the PNG version of the image. If the buffered-content-data does not have a PNG version of the image, then the target application determines whether the buffered-content-data has a RAW version of the image. If so, the target application requests the RAW version from the clipboard and creates a RAW file based on the RAW version of the image.

By saving only a single file for each non-file content item represented in the buffered-content-data, the user avoids the inconvenience of having to create and then delete numerous files for the same non-file content item. Thus, the user saves both computer resources and time.

The ordered list of preferences for each type of non-file content item may be built-in to the target application. According to one embodiment, the built-in list may simply be used as a default, where the user may override the default by specifying different file format preferences in the settings of the target application. Alternatively, the entire list of format preferences may be user-specified.

As another example, the clipboard may contain two versions of a link: the text string version and a binary p-list. A binary p-list is a key/value dictionary of information about the webpage that corresponds to the link. Due to the additional information contained therein, the target application may prefer the binary p-list format. Consequently, when both formats are present, the target application requests from the clipboard the binary p-list rather than the text string. Based on the additional information that the binary p-list contains, the target application may create a "cloud document" in the file system. The cloud document may be, for example, a JSON file that includes the link and that is named based on the metadata contained in the binary p-list. In response to user activation of the cloud document, the webpage that corresponds to the link is opened in a browser.

In some cases, it may not be apparent from the metadata associated with an item which file type is best for an item. Under these circumstances, the target application may analyze the data that represents the non-file content item to determine the appropriate filetype for the to-be-created file. For example, metadata within the buffered-content-data may indicate that a particular non-file content item is plaintext. Under these circumstances, rather than assume that a text file is the appropriate file format, the target application may analyze the plaintext to determine whether the plaintext actually represents a link. If the plaintext represents a link, then the target application may create a shortcut file based on the link in response to the clipboard-to-file paste operation. On the other hand, if the plaintext does not appear to be a link, or appears to be a link along with additional text, then the target application may create a text document in response to the clipboard-to-file paste operation.

As another example, the metadata associated with a non-file content item in the buffered-content-data may be relatively generic. For example, the metadata associated with a non-file content item may simply indicate that the non-file content item is represented on the clipboard as binary data. Often, the type and format of a non-file content item may be determined from the first few bytes of the data that represents the non-file content item. Under these circumstances, the target application may "sniff" the first few bytes of the binary data and, based on those bytes, determine that the data item is an audio clip represented in a particular audio format.

Creation of File(s) in Response to a Clipboard-to-File Paste Operation

Once the target application has determined which files (and filetypes) to create in response to a clipboard-to-file paste operation, the target application makes the calls necessary to create and populate those files. The specific operations performed to create and populate files will vary from implementation to implementation, based on the nature of the target application and the content management system in which the files are being created.

For example, in one embodiment, the target application may be a front-end component of a content management system. Under these circumstances, the creation of files may involve the target application making calls to create temporary versions of the files locally, and then making calls to upload the locally-created files to a backend services of the content management system.

According to some embodiments, during performance of a clipboard-to-file paste operation, the target application acts as an intermediary between the system clipboard and an upload service that belongs to a content management system. The target application makes calls to the system clipboard to obtain the desired versions of non-file content items from the clipboard, and makes calls to the upload service to cause the content management system to create files, having the desired file format, populated with the content returned by the system clipboard.

When the target application makes calls to the system clipboard to retrieve a version of a non-file content item from the clipboard, the system clipboard returns the requested data from the clipboard either "in-memory" or "on-disk". To obtain an "in-memory" copy of the non-file content item, the target application may send a request to the system clipboard for the type of content item to retrieve from the clipboard. For example, the target application may ask the system clipboard for a "string" version of a non-file content item that is on the clipboard, or an "image" of a non-file content item that is on the clipboard. Upon receiving the non-file content item in the specified format, the target application may provide the data that represents the non-file content item in an upload call to a content management system. In addition to the content of the non-file content item itself, the upload call may include values for input parameters such as file name, file extension, and a target location at which the file for the non-file content item is to be created.

When the target application asks the system clipboard to return requested clipboard data on-disk (for example, to conserve volatile memory), obtaining the appropriate data for the non-file content item may be more complex. According to some embodiments, the target application obtains the data for a non-file content item by asking the system clipboard for a URL that points to the desired non-file content item data on disk. The system clipboard may respond to such a request by providing a URL such as: /path/to/a/container/tmp/076b8c96-a786-4655-bab9-1f23654f1408'. The target application may then move data from the disk location that corresponds to that URL into an in-memory container, and make a call to the upload service of the content management system to put the in-memory container in upload queue. During the upload operation, the content management system uploads a group of chunks that correspond to the non-file content item, and then commits those chunks. The upload operation, for example, have the form similar to "create file using chunk A, B, C with file name /path/to/file.txt".

In situations where the system clipboard returns a URL to on-disk data, the part of the clipboard data that is written to disk by the system clipboard is determined by the target application based on rules, as discussed above. For example, when the non-file content item is text, the rules may dictate selecting plain text utf8 rather than rich text, etc. Similarly, as discussed above, the file name committed to the server may be determined by the target application based on metadata in the buffered-content-data.

Example Implementation of Clipboard-to-File Paste Operations

As mentioned above, the actual implementation of clipboard-to-file paste operations may vary based on a variety of factors, such as whether the file system in which the files are being created is local or online ("in the cloud"), the operating system used to buffer the non-file content items in question, the nature and number of the non-file content items represented in the buffered-content-data, etc.

Figure 4B:
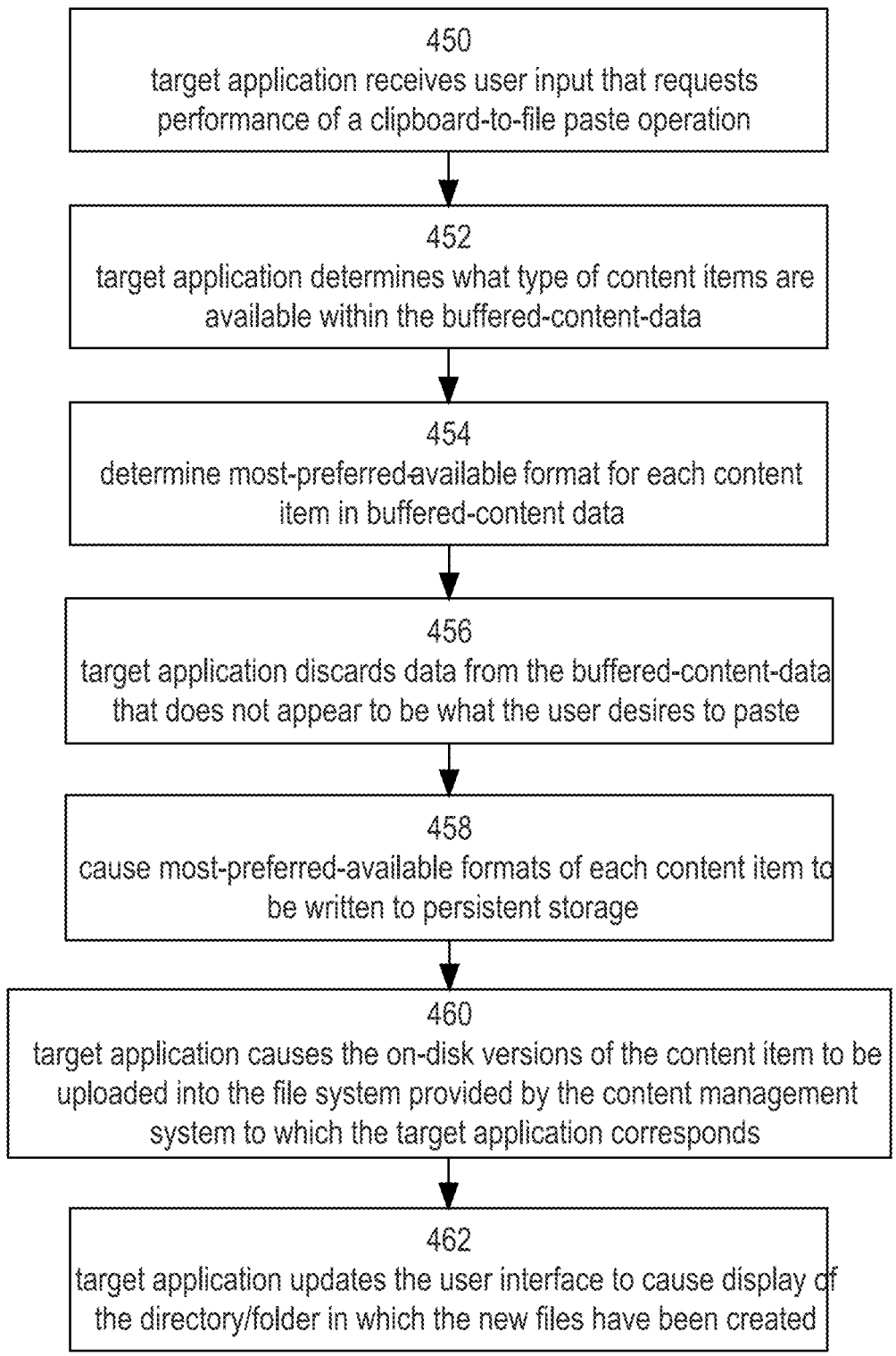
FIG. 4B is a flowchart illustrating steps for performing a many-to-many clipboard-to-file paste operation to a content management system, according to some embodiments.

Referring to FIG. 4B, it is a flowchart illustrating steps for performing a many-to-many clipboard-to-file paste operation in some embodiments where the file system in which the files are created is the file system of a content management system. For the purpose of explanation, it shall be assumed that a user has already copied into the clipboard selected data that includes one image, one link, and text.

At step 450, the target application receives user input that requests performance of a clipboard-to-file paste operation. At step 452, the target application determines what type of non-file content items are available within the buffered-content-data. This determination may be performed, for example, by making calls to the operating system that manages the clipboard. In addition or alternatively, the target application may inspect the metadata included in the buffered-content-data, or analyze the data that represents the non-file content items themselves. In the present example, at step 452 the target application may determine that the buffered-content-data includes six distinct representations for the image (link, raw, JPEG, PNG, etc.), two representations of the link (e.g. plaintext and binary p-list), and four versions of the text (e.g. rich-text format, UTF8 plaintext format, UTF16 plaintext format, and plaintext format).

At step 454, the target application determines the most-preferred-available format for each non-file content item in the buffered-content-data. The most-preferred-available format for an item may not always be the highest-ranked format for that type of non-file content item. For example, assume that JPEG is the highest ranked format for images, and that PNG is the second highest ranked format for images. In this case, if the buffered-content-data does not have a JPEG representation of the image, but does have a PNG representation of the image, then the PNG representation would be selected at step 454 as the most-preferred-available format for that image.

At step 456, the target application discards data from the buffered-content-data that does not appear to be what the user desires to paste. This may include, for example, garbage data and less-preferred versions of each non-file content item in the buffered-content-data. For example, assume that the preferred format for images is JPEG, the preferred format for links is binary p-list, and the preferred format for text is UF8 plaintext. Assume further that the buffered-content-data includes representations of the image, link and text in these preferred formats. Under these circumstances, step 456 may involve discarding all versions of the image file other than the JPEG version, all versions of the link other than the binary p-list version, and all versions of the text other than the UF8 plaintext version.

At step 458, the target application causes the most-preferred-available formats of each non-file content item to be written to persistent storage. Step 458 may involve, for example, making calls to "item providers" provided by the operation system to write portions of the buffered-content-data to disk storage. In response to such write operations, the target application may receive from the operating system links that correspond to the on-disk versions of the non-file content items. In the present example, the target application makes calls to item providers to temporarily store, in local persistent storage, the JPEG version of the image, the UF8 version of the text, and the binary p-list version of the link. Typically, the persistently-stored items that are created at step 458 will have meaningless names and will be treated by the local file system in which they are stored as binary files that merely contain persistently-stored copies of portions of the buffered-content-data.

At step 460, the target application causes the on-disk versions of the non-file content item to be uploaded into the file system provided by the content management system to which the target application corresponds. According to one embodiment, step 460 involves making a call to an upload service for each file item to be created. Those calls may include the links that correspond to the on-disk versions of the non-file content items. In addition to the links, the calls to the upload service may contain additional information, such as the folder/directory to which the files should be uploaded and stored, the specific type of files to be created, and the filename for each of the files being uploaded.

In response to the upload request for each non-file content item, the content management system formats the non-file content item in a manner that conforms to the file type specified in the upload request, stores the file in the specified folder/directory, and names the file the specified filename. Techniques for determining the filenames for non-file content items shall be described in greater detail hereafter. After the upload of a non-file content item, the persistently-stored copy of the buffered-content-data that corresponds to the non-file content item is automatically deleted.

According to one embodiment, the target application provides a user interface for navigating the directory structure of the content management system. In such some embodiments, the directory into which the files are uploaded may be the directory that is currently "open/active" in the user interface provided by the target application. If no directory is currently open in the target application, or the target application is not displaying an interface for navigating the content management system, then the directory into which the files are uploaded may be a default directory, such as the "root" directory for the user that triggered the clipboard-to-file paste operation.

Step 462 is an optional step that may be performed by a target application in situations where the target application supports display of a user-interface for navigating the file system in which the files have been created. At step 462, the target application updates the user interface to cause display of the directory/folder in which the new files have been created. Thus, in response to the clipboard-to-file paste operation performed in FIGS. 1A-1D, the content of the image of the cat is uploaded to a content management system, is stored as Gordon.jpg in a particular directory of that content management system, and then the target application transitions to a display of the directory in which the new image file has been created, as illustrated in FIG. 1E.

Determining Target Locations for Items in the Buffered-Content-Data

In various embodiments, creation of the new file may involve automatic selection, by the target application, of a file system location for the new file. In some embodiments, the target application presents a file system interface to the user. In such embodiments, the automatic selection of a file system location may be based, for example, on the currently active directory/folder of the file system user interface. Alternatively, new files created by clipboard-to-file paste operations may be created in a default directory, which may be selectable through controls in the target application.

Determining a File Name for the Buffered-Content-Data

In various embodiments, creation of the new file may also involve automatic selection of a filename for the new file. The filename for the new file may be based on metadata contained in the buffered-content-data. For example, if an image named "foo.jpg" were copied into the clipboard from a web page displayed in a web browser, the buffered-content-data associated with the image may include metadata that specifies the name "foo.jpg". Based on this metadata, the target application may automatically select "foo.jpg" as the name of the file created by the target application during the clipboard-to-file paste operation. As another example, if a filename is not specified in the metadata, the filename for the clipboard-to-file paste operation may be determined based on other information in the buffered-content-data. For example, the buffered-content-data may indicate that the information in the clipboard is an image. Based on this information, the target application may select the name "image pasted on XXX", where XXX is the date and time at which the clipboard-to-file paste operation is performed.

As mentioned above, when creating (or uploading) files for non-file content items in a clipboard-to-file paste operation, the calls made to the file system (or upload service) include filenames for each of the to-be-created files. The filename of the file for each non-file content item is determined by the target application. In some cases, the filename may be based on metadata associated with the non-file content item. In other cases, additional steps may be performed by the target application to determine an appropriate filename.

In a simple scenario, the metadata in the buffered-content-data may itself specify a filename. For example, when the buffered-content-data includes an image, the metadata within the buffered-content-data may include the name of the file from which the image originated. For example, the metadata that is placed in the clipboard when a cat image is copied into the clipboard may include the filename (i.e. gordonjpg) from which the image originated (see FIGS. 1A-1E). In this case, the target application may simply use that same filename for the new file that is created for the image in response to the clipboard-to-file paste operation (see FIG. 1E).

In other cases, the metadata itself may not contain any filename. In such cases, the target application may derive the filename from other available metadata. As one example, the link copied from a webpage may be assigned a filename that reflects that hostname of the link. If the link is associated with certain text in the webpage from which the link was copied, then the target application may derive the filename based on that text.

Alternatively, if a meaningful filename cannot be derived from the metadata associated with a non-file content item, the filename may simply reflect the type of the non-file content item. Thus, a file created based on an image may simply be named "pasted image", while the file created based on a text item may simply be named "pasted text". The filename may reflect additional information, such as the source application in which the copy/cut operation was performed and/or an identifier of the user that performed the clipboard-to-file paste operation.

In some cases, the file extension portion of the filename is easily determined. For example, the extension .jpg may be used as the extension for an image file that originated from a file named gordon.jpg. However, in situations where the extension is not readily apparent from the metadata in the buffered-content-data, and multiple extensions are available for the most-preferred-available format of a data item, then determining the file extension may involve (a) making a call to the file system to determine an appropriate extension, (b) selecting a most-preferred extension for the format in question, or (c) analyzing the data that represents the non-file content item.

For example, if the most-preferred-available format of an image is JPEG, and images in the JPEG format may either have extension .JPG or JPEG, then the extension .JPG may be selected based on preference data that indicates the .JPG extension is preferred over the .JPEG extension for images that have the JPEG format.

As another example, the pasted non-file content item may be audio data, and the metadata may not specify the extension that is best suited to the audio data. As explained above, the target application may "sniff" the first few bytes of the audio data to determine the particular format in which the audio data is represented. Based on that particular format, the target application selects an appropriate extension for the audio data file that is created in response to the clipboard-to-file paste operation.

Links to Known Intra-System Files

As explained above, when a clipboard-to-file operation involves a link, the clipboard-to-file paste operation may result in creation of a shortcut file for the link, or a text file containing the text of the link. According to one embodiment, the target application operates differently when the copied link is to an "intra-system" file. An intra-system file is a file that is managed by the content management system that is the target of the clipboard-to-file paste operation.

When the copied link is to an intra-system file, rather than create/upload a shortcut file or a text file, the target application does not perform any upload. Instead, the target application causes the content management system to initiate a file copy operation. The file copy operation copies the file that corresponds to the link from its source location in the content management system to the folder/directory that is the target of the clipboard-to-file paste operation. Thus, even though the non-file content item that was placed in the clipboard in the copy operation was only a link, the clipboard-to-file paste operation causes creation of a copy of the entire intra-system file that corresponds to the link.

Post-File-Creation Actions

According to one embodiment, the target application is designed to perform one or more additional actions automatically after new file(s) have been created by a clipboard-to-file paste operation. For example, in one embodiment, after creating one or more files in a content management system in response to a clipboard-to-file paste operation, the target application may replace the current contents of the clipboard with links that refer to the newly-created files. For example, after a new file Gordon.jpg is created in the content management system, as illustrated in FIG. 1E, the target application may replace the current contents of the clipboard with a link that corresponds to the newly-created Gordon.jpg file. Consequently, the newly-created Gordon.jpg file will serve as the content source for any subsequent paste operation (whether the paste operation is a conventional paste operation, or a clipboard-to-file paste operation). Since the new Gordon.jpg file qualifies as an intra-system file, a subsequent clipboard-to-file paste operation may, for example, cause the new Gordon.jpg file to be copied from its location in the content management system to another location within the content management system.

Settings for Clipboard-to-File Paste Operations

Operation of the target application may be adjusted based on user-selectable settings. For example, as a non-exclusive list, the target application may have settings that specify:
- which formats of preferred for each content type
- the default directories for files created by clipboard-to-file paste operations
- how to determine names for files created by clipboard-to-file paste operations
- whether the clipboard is to be replaced with links to the newly created files after clipboard-to-file paste operations
- whether clipboard-to-file paste operations are to create more than one file version for each item in the clipboard
- how to handle clipboard-to-file paste operations involving links to intra-system files
- whether to trigger a "manual-intervention interface" when clipboard-to-file paste operations are performed.

Manual-intervention interfaces shall be described in greater detail hereafter.

Interactive Clipboard-to-File Paste Operations

While a user's general preferences may be specified using the settings of the target application, the user's preferences may vary from operation to operation. For example, in most situations the user may prefer a single .jpg image to be created for each image involved in a clipboard-to-file paste operation. However, for a particular clipboard-to-file paste operation of a particular image, the user may desire creation of a .png file, or both a .jpg and .png file for the image. To handle situations where the user desires to override the defaults, the target application may support a special clipboard-to-file paste operation in which, prior to creation of files based on the non-file content items of the clipboard, the target application enters an interactive mode in which the user is presented one or more "manual-intervention" interfaces.

The manual-intervention interfaces may provide controls for overriding virtually any of the aspects of the clipboard-to-file paste operation. For example, assume that a clipboard-to-file paste operation is performed while the buffered-content-data contains multiple versions of each of two images. In this scenario, a manual-intervention interface may allow the user to select, for each of the images, the format(s) for the file(s) to be created for the image. For example, for the first image, the manual-intervention interface may list jpg, png, and raw, with the checkbox next to jpg initially checked. If the user wants both a jpg version and a png version of the first image, the user may additionally check the checkbox next to png. On the other hand, if the user wants a png version of the image instead of a jpg version of the image, the user unchecks the jpg checkbox and checks the png checkbox.

Similarly, with respect to filename, the manual-intervention interface may display the names that the target application determined based on the metadata associated with the images. The names may be displayed in editable textboxes that allow the user to change the names according to the user's preferences. In one embodiment, the manual-intervention interface may include a preview of the image so that the user can be sure which image the filename is for.

The manual-intervention interface may also allow the user to specify different target directories for each of the to-be-created files. Thus, the user may specify that a file for a jpg version of an image be uploaded to one folder/directory of the content management system, while a png version of the image be uploaded to a different folder/directory of the content management system.

Virtually any global preference may be overridden using manual-intervention interfaces, including but not limited to:
- for each non-file content item, which format(s) to create files for
- directories for files created by the clipboard-to-file paste operation
- names for files created by the clipboard-to-file paste operation
- whether the clipboard is to be replaced with links to the newly created files after clipboard-to-file the paste operation
- how to handle a clipboard-to-file paste operation involving a link to an intra-system file In some cases, the manual-intervention interface may be used to indicate that no files should be created for some of the items on the clipboard. For example, the "copy" operation may have included a group of ten images, where only two of the selected images are of interest to the user. In this example, the user may use a manual-intervention interface to specify that files are to be created for only those two images. Similarly, if the selection includes an image, a link, and text, the user may only be interested in the link and the text. Under these circumstances, the user may use the manual-intervention interface to specify that files are to be created only for the link and the text.

When a user has overridden default settings of the clipboard-to-file paste operation, the calls made to the upload service to upload the content item as files in the content management system specify the override parameters, rather than the default parameters. Consequently, the files that are created by the clipboard-to-file paste operation are created with the names, in the formats, in the folders/directories, as specified by the user.

In addition to manual-intervention interfaces that override default operation of the clipboard-to-file paste operation, the interactive mode may involve launching applications that can edit/adjust the non-file content items prior to upload. For example, if the clipboard contains an image, interactive mode may cause the launch of an image editing application. The image editing application may allow the user to edit the persistently-stored copy of the item prior to upload to the content management system.

As another example, if the clipboard contains an audio file, the interactive mode may cause the target application to launch an audio editor application prior to making the call to the upload service to cause a new audio file to be created. The audio editor application may be used to select a subset of the non-file content item, such as a short audio clip. In response, the persistently-stored version of the non-file content item may be edited down to the short audio clip prior to calling the upload service. Thus, the resulting audio file created in the content management system will only contain the selected audio clip, rather than the entire audio file that was originally copied to the clipboard.

The Clipboard-to-File Paste Control Interface

Instead of or in addition to displaying manual-intervention interfaces after a clipboard-to-file paste operation has been initiated, the interface that has the clipboard-to-file paste control may be enhanced to give a preview of what may occur when the clipboard-to-file paste operation is selected. For example, rather than simply showing the word "paste" as in FIG. 1D, the interface with the paste control may also show a preview of the non-file content item(s) that are currently in the clipboard. Thus, if the clipboard contains two images, a link, and text, the preview may display the two images, the link, and the text. Further, the paste control interface may also display the directory in which files will be created, and the format types of those files. If a non-file content item in the clipboard is large, the preview representation may be a smaller version of the item (e.g. a thumbnail of a large image) or simply a representative portion of the item (e.g. the first page of a multi-page .pdf document).

Example Content Management System

Figure 5:
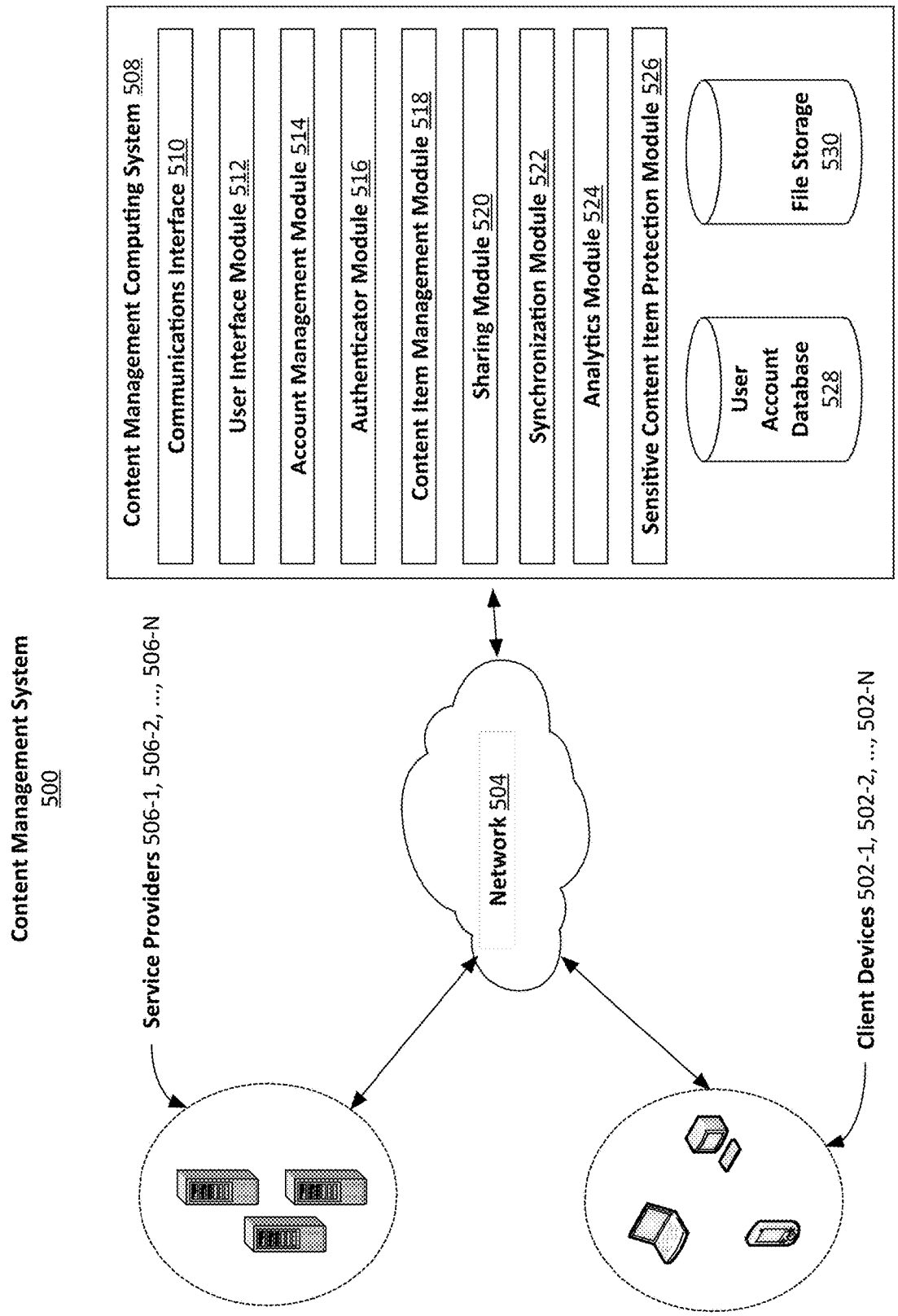
FIG. 5 is a block diagram of a content management system that may be used in conjunction with the clipboard-to-file paste techniques described herein, according to some embodiments.

With respect to implementing various embodiments of the disclosed technology, example content management system 500 is shown in FIG. 5, wherein electronic devices communicate via a network for purposes of exchanging content and other data. System 500 can be configured for use on data communications network 504. Data communications network 504 can be the Internet or other wide-area data communications network, for example. However, the disclosed techniques can be implemented in a variety of network configurations that facilitate the intercommunication of electronic devices via a wired or wireless data communications network. For example, while data communications network 504 can be the Internet where content management computing system 508 is implemented as a "cloud" computing service, data communications network 504 can be a local wireless area network or other type of local area network within a home or office, for example, where content management computing system 508 is a computing appliance within the home or office. Although not shown in FIG. 5, a client device 502 may communicate with content management computing system 508 via a different data communications network than a service provider 506. For example, a client device 502 may communicate with content management computing system 508 via a local area network and a service provider 506 may communicate with content management computing system 508 via the Internet.

In system 500, a user can interact with content management computing system 508 through a client device 502 connected to network 504. Content management computing system 508 can be implemented with a single computing device (e.g., a server) or with multiple computing devices (e.g., multiple servers) that are configured to perform the functions or operations described herein. Content management computing system 508 can support connections from a variety of different types of client device, including, but not limited to, a desktop computer, a mobile computer, a mobile communications device, a mobile phone, a smart phone, a tablet computer, a smart television, a set-top box, or any other data communications network-enabled computing device. A client device 502 can be of varying type and capability and be configured with a varying type of operating system (e.g., a UNIX-based or a WINDOWS-based operating system). Furthermore, content management system 508 can concurrently accept network connections from and concurrently interact with multiple client devices 502.

A user can interact with content management computing system 508 via a client-side application installed on a client device 502. The client-side application can include a content management system specific component. For example, the component can be a stand-alone application, one or more application plug-ins, or a web browser extension. However, the user can also interact with content management computing system 508 via a third-party application, such as a web browser, that is installed and executes on the client device 502 and is configured to communicate with content management system 508. In either case, the client-side application can present a graphical user interface (GUI) for the user to interact with content management computing system 508. For example, the user can interact with the content management system 508 via a client-side application integrated with the file system or via a webpage displayed using a web browser application.

Content management computing system 508 can enable a user to store "content files" (e.g. image files, text files, media files, shortcut files, etc.), including sensitive content files. Content management computing system 508 also can enable users to create and navigate through "container files" such as folders that contain content files. As used herein, the term "files" refers to both content files and container files.

Content management computing system 508 can enable a user to perform a variety of content management tasks, such as retrieve, modify, browse, or share the files. Furthermore, content management computing system 508 can enable a user to access files from multiple client devices 502. For example, a client device 502 can upload a file to content management computing system 508 via network 504. Later, the same client device 502 or some other client device 502 can retrieve the file from content management computing system 508.

To facilitate the various content management services, a user can create an account with content management computing system 508. User account database 528 can maintain the account information. User account database 528 can store profile information for a registered user. For example, the profile information may include a username or email address for the registered user. However, content management computing system 508 can also be configured to accept additional user information such as birthday, address, billing information, etc.

User account database 528 can include account management information, such as account type (e.g., free or paid), usage information, (e.g., file viewing, editing, and sharing history), maximum file storage space authorized, file storage space used, file storage locations, security settings, personal configuration settings, file sharing data, etc. Account management module 514 can be configured to update or obtain user account details in user account database 528. The account management module 514 can be configured to interact with any number of other modules in content management computing system 508.

An account can be used to store files, such as digital data, documents, text files, audio files, video files, cloud documents, etc., from one or more client devices 502 authorized on the account. The files can also include collections for grouping files together with different behaviors, such as folders, playlists, albums, etc. For example, an account can include a public folder that is accessible to any user. The public folder can be assigned a web-accessible address. A unique link (e.g., a unique Uniform Resource Locator (URL)) to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The files can be stored in file storage 530. File storage 530 can be a storage device, multiple storage devices, or a server. Alternatively, file storage 530 can be a cloud storage provider or network storage accessible via a data communications network. Content management computing system 508 can hide the complexity and details from client devices 502 so that client devices 502 do not need to know exactly where or how the files are being stored by content management computing system 508. For example, content management computing system 508 can store the files in the same collection hierarchy as they appear on a client device 502. However, content management computing system 508 can store the files in its own order, arrangement, or hierarchy. Content management computing system 508 can store the files in a network accessible storage (NAS) device, in a redundant array of independent disks (RAID), etc. File storage 530 can store files using one or more partition types, such as FAT, FAT32, NTFS, EXT2, EXT3, EXT4, HFS/HFS+, BTRFS, and so forth.

File storage 530 can also store metadata describing files, file types, and the relationship of files to various accounts, collections, or groups. The metadata for a file can be stored as part of the file or can be stored separately. In an implementation, each file stored in file storage 530 may be assigned a system-wide unique identifier.

File storage 530 can decrease the amount of storage space required by identifying duplicate files or duplicate segments or blocks of files. Instead of storing multiple copies of the duplicate files, segments, or blocks, file storage 530 can store a single copy and then use a pointer or other mechanism to link the duplicates to the single copy. Similarly, file storage 530 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management computing system 530 can be configured to support automatic synchronization of files from a client device 502. The synchronization can be platform agnostic. That is, the files can be synchronized with a client device 502 without requiring a particular type, capability, or operating system of the client device 502. For example, a client device 502 can include client software, which synchronizes, via synchronization module 522 at content management computing system 508, files stored in at a client device 502's file system with the files in an associated user account. In some cases, the client software can synchronize any changes to files in a designated collection and its sub-collections, such as new, deleted, modified, copied, or moved files or collections. The client software can be a separate software application, can integrate with an existing content management application in the operating system, or some combination thereof. In one example of client software that integrates with an existing content management application, a user can manipulate files directly in a local collection, while a background process monitors the local collection for changes and synchronizes those changes to content management computing system 508. Conversely, the background process can identify files that have been updated at content management computing system 508 and synchronize those changes to the local collection. The client software can provide notifications of synchronization operations and can provide indications of content statuses directly within the content management application. Sometimes a client device 502 may not have a network connection available. In this scenario, the client software can monitor the linked collection for file changes and queue those changes for later synchronization to content management computing system 508 when a network connection is available. Similarly, a user can manually start, stop, pause, or resume synchronization with content management computing system 508.

A user can view or manipulate a file via a web interface generated and served by user interface module 512. For example, the user can navigate in a web browser to a web address provided by content management computing system 508. Changes or updates to the file in the file storage 530 made through the web interface, such as uploading a new version of the file, can be propagated back to another client device 502 associated with the user's account. For example, multiple client devices 502, each with their own client software, can be associated with a single account and files in the account can be synchronized between each of the multiple client devices 502.

Content management computing system 508 can include a communications interface 510 for interfacing with a client device 502 and can interact with a service provider 509 via an Application Program Interface (API). Certain software applications can access file storage 530 via an API on behalf of a user. For example, a software package, such as an app running on a smartphone or tablet computing device, can programmatically make calls directly to content management computing system 508, when a user provides credentials, to read, write, create, delete, share, or otherwise manipulate a file. Similarly, the API can allow a user to access all or part of file storage 530 through a web site.

Content management computing system 508 can also include authenticator module 516, which can verify user credentials (e.g., a username and password), a security token, an API call, a client device, and so forth, to ensure only an authorized client and user can access a file. In an implementation, authenticator module 516 authorizes a user to interact with content management computing system 508 based on user credentials the user keeps with a service provider 509 without the user having to provide the user credentials to content management computing system 508 using an industry-standard delegated authorization framework such as Open ID Connect (OIDC), OAuth 2.0, or the like.

Content management computing system 508 can include analytics module 524 module that can track and report on aggregate file operations, user actions, network usage, total file storage space used, as well as other technology, usage, or business metrics. A privacy or security policy can prevent unauthorized access to user data stored with content management computing system 508.

Content management computing system 508 can include sharing module 520 for managing sharing a file publicly or privately. Sharing content publicly can include making the file accessible from any computing device in network communication with content management computing system 508. Sharing content privately can include linking the file in file storage 530 with two or more user accounts so that each user account has access to the file. The sharing of the file can be performed in a platform agnostic manner. That is, the file can be shared with a client device 502 with requiring the client device 502 to be a particular type, to have a particular capability, or be configured with a particular operating system. The file can also be shared across varying types of user accounts including individual, personal, group, or team accounts.

Content management computing system 508 can be configured to maintain a file directory identifying a location of each file in file storage 530. The file directory can include a unique file entry for each file stored in file storage 530. A file entry can include a file path that can be used to identify a location of a file in file storage 530 or at a client device 502. For example, the content path can include the name of the file and a folder hierarchy associated with the file. For example, the file path can include a folder or path of folders in which the file is placed as well as the name of the file. Content management computing system 508 can use the file path to present the file in the appropriate folder hierarchy. A file entry can also include a file pointer that identifies a location of the file in file storage 530. For example, the content pointer can include a storage address of the file in non-transitory computer-readable media. The file pointer can point to multiple locations in file storage 530, each of which contains a portion (e.g., a block or segment) of the file.

In addition to a file path and a file pointer, a file entry can also include a user account identifier that identifies the user account that has access to the file. Multiple user account identifiers can be associated with a single file entry indicating that the file has shared access by the multiple user accounts.

To share a file privately, sharing module 520 can be configured to add a user account identifier to the file entry associated with the file, thus granting the added user account access to the file. Sharing module 520 can also be configured to remove user account identifiers from a file entry to restrict a user account's access to the file. The user account identifier in a file entry may also be associated with an access permission indicating a type of access that the user account has to the corresponding file. A file entry may contain multiple different access permissions associated with a user account identifier depending on the access permissions the user account is granted with respect to the file. Non-limiting examples of access permissions that may be associated with a user account identifier in a file entry include view, edit, delete, share, download, etc.

To share content publicly, sharing module 520 can be configured to generate a unique link, such as a unique uniform resource locator (URL), which allows a web browser or other client application to access the file in content management computing system 508 without an authentication. To accomplish this, sharing module 520 can be configured to include file identification data in the generated unique link, which can later be used to properly identify and return the requested file. For example, sharing module 520 can be configured to include the user account identifier and the content path in the generated unique link. Upon selection of the unique link, the file identification data included in the unique link can be transmitted to content management computing system 508 which can use the received file identification data to identify the appropriate file entry and return the file associated with the file entry.

In addition to generating the unique link, sharing module 520 can also be configured to record that unique link to the file has been created. The file entry associated with a file can include a unique link flag indicating whether a unique link to the file has been created. For example, the unique link flag can be a Boolean value initially set to 0 or false to indicate that a unique link to the file has not been created. Sharing module 520 can be configured to change the value of the flag to 5 or true after generating a unique link to the file.

Sharing module 520 can also be configured to deactivate a generated unique link. For example, each file entry can also include a unique link active flag indicating whether the file should be returned in response to a request from the generated unique link. For example, sharing module 520 can be configured to only return a file requested by a generated link if the unique link active flag is set to 5 or true. Thus, access to a file for which a unique link has been generated can be easily restricted by changing the value of the unique link active flag. This allows a user to restrict access to the shared file without having to move the file or delete the generated unique link. Likewise, sharing module 520 can reactivate the unique link by again changing the value of the unique link active flag to 5 or true. A user can thus easily restore access to the file without the need to generate a new unique link.

While content management computing system 508 is presented with specific components, it should be understood by one skilled in the art, that the architectural configuration of system 508 is simply one possible configuration and that other configurations with more or fewer components are possible.

Content management system 508 includes sensitive file protection module 526 for protecting sensitive files stored in file storage 530. Sensitive file protection module 526, in combination with other module(s) of system 508, is configured to protect sensitive files stored in file storage 530 according to the disclosed techniques. For example, module 526 may be encompass computer program instructions configured to perform a method disclosed herein for protecting a user of content management computing system 508 from inadvertently or accidentally disclosing sensitive information contained in a file hosted with the system 508 and executed by system 508 to perform the method.

Reference herein to "hosting" a file with content management computing system 508 encompasses a user using content management computing system 508 to bring the file under management of system 508. For example, a file that a user hosts with system 508 may be one that the user uploads, synchronizes, or otherwise provides to system 508. When a file is hosted with system 508, a digital copy or digital representation of the file is stored in file storage 530 either as a file, a set of one or more blocks or segments, or in other suitable data storage form.

Computing System Implementation

Any of the above techniques may be implemented using a computing system.

A computing system may encompass one or more processors and storage media. The one or more processors and the storage media are provided by one or more computing devices of the computing system. An example computing device 600 with processor(s) 604 and storage media (e.g., storage system 610, ROM 608, or main memory 606) is described below with respect to FIG. 6. The storage media stores instructions which, when executed by the computing system, cause the computing system to perform any of the above techniques.

One or more non-transitory media may store instructions which, when executed by the computing system, cause the computing system to perform any of the above techniques.

A computing device of the computing system may host one or more hypervisors that operate on the computing device and emulate or virtualize computing hardware. A hypervisor can be a Type-1 (bare-metal hypervisor) or Type-2 hypervisor (hosted hypervisor), for example.

A computing device of the computing system may employ operating system-level virtualization in addition to, or in the absence of, one or more hypervisors. With operating system-level virtualization, the operating system kernel facilitates multiple isolated user space instances sometimes referred to as containers, zones, virtual private servers, partitions, virtual environments, virtual kernels, jails, etc.

The computing system may encompass multiple computing devices in a distributed computing environment. Together, the multiple computing devices performs any of the above techniques. In such an environment, computing devices may be continuously, periodically, or intermittently interconnected by one or more data communications networks (e.g., one or more Internet Protocol (IP) networks.)

Example Computing Device

Figure 6:
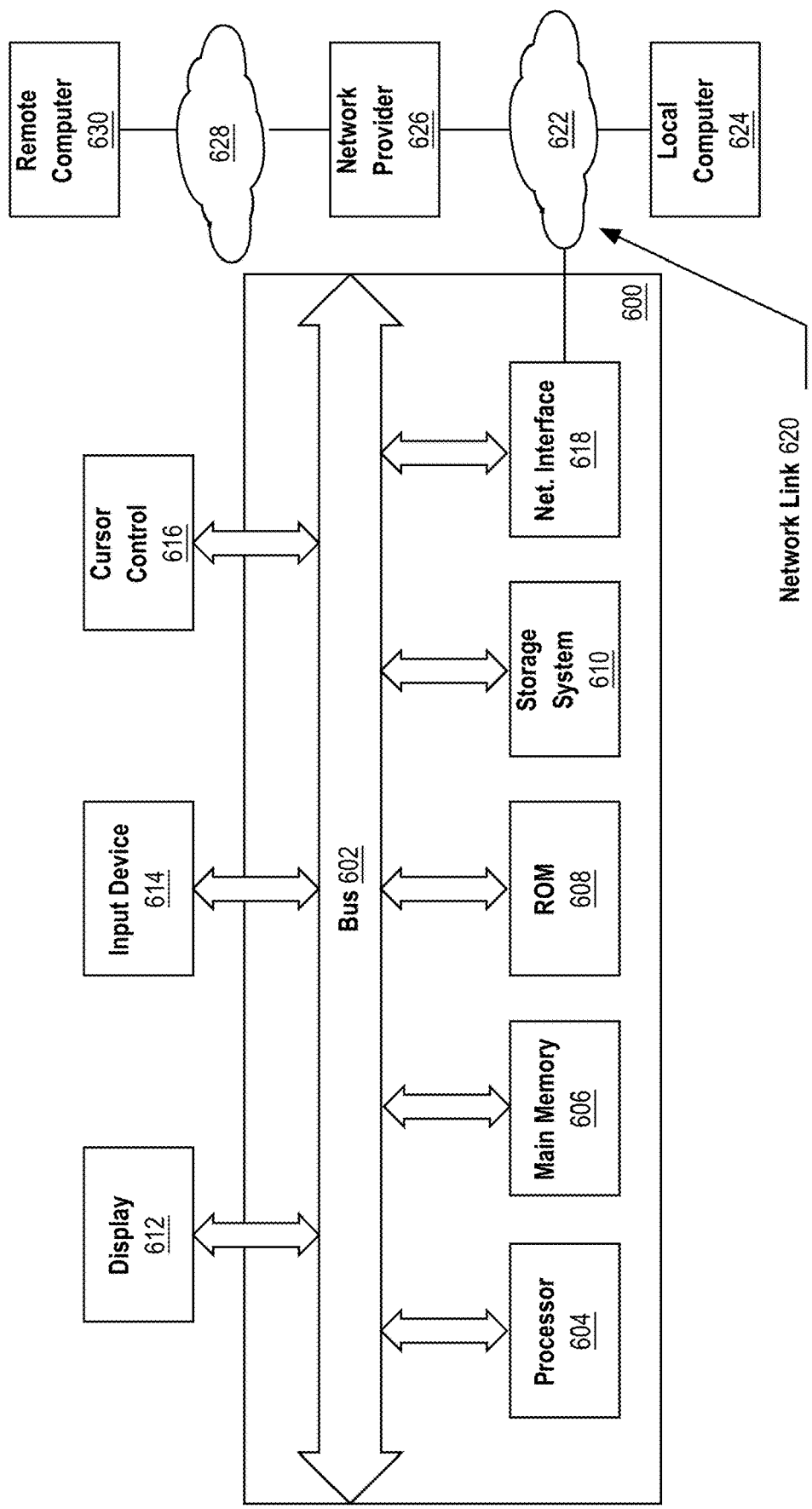
FIG. 6 is a block diagram of a computer system upon which embodiments of the techniques described herein may be implemented.

FIG. 6 illustrates example computing device 600. Computing device 600 includes bus 602 or other communication mechanism for communicating information, and one or more hardware processors 604 coupled with bus 602 for processing information. Computing device 600 is just one example of a possible computing device that may be used in an implementation. Other computing device configurations having more, fewer, or different components may be used in an implementation.

Hardware processor(s) 604 include, for example, one or more general-purpose microprocessors, central processing units (CPUs) or cores thereof, graphics processing units (GPUs), or systems on a chip (SoCs).

Computing device 600 also includes main memory 606, implemented by one or more volatile memory devices, coupled to bus 602 for storing information and instructions to be executed by processor(s) 604. Main memory 606 also may be used for storing temporary variables or other intermediate information during execution of instructions by processor(s) 604.

Computing device 600 includes read-only memory (ROM) 608 or other static storage device coupled to bus 602 for storing static information and instructions for processor(s) 604.

Storage system 610 implemented by one or more non-volatile memory devices is provided and coupled to bus 602 for storing information and instructions.

Computing device 600 is coupled via bus 602 to display 612, such as a liquid crystal display (LCD), a light emitting diode (LED) display, or a cathode ray tube (CRT), for displaying information to a computer user. Display 612 may be combined with a touch sensitive surface to form a touch screen display. The touch sensitive surface may be an input device for communicating information including direction information and command selections to processor(s) 604 and for controlling cursor movement on display 612 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 614, including alphanumeric and other keys, is coupled to bus 602 for communicating information and command selections to processor(s) 604. Another type of user input device is cursor control 616, such as, for example, a mouse, a trackball, or cursor direction keys, for communicating direction information and command selections to processor(s) 604 and for controlling cursor movement on display 612. For example, his input device may have two degrees of freedom in two axes, a first axis (e.g., x) and a second axis (e.g., y), that allows the device to specify positions in a plane.

Computing device 600 in response to processor(s) 604 executing instructions contained in main memory 606 may performs any of the above techniques. Such instructions are read into main memory 606 from another storage medium, such as storage system 610. Execution of the instructions contained in main memory 606 may cause processor(s) 604 to perform any of the above techniques. Hard-wired circuitry may be used in place of or in combination with instructions to perform any of the above techniques.

The term "storage media" as used herein refers to any non-transitory media that store data or instructions that cause a machine to operate in a specific fashion. Such storage media may comprise non-volatile media (e.g., storage system 610) or volatile media (e.g., main memory 606). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 602. Transmission media can also take the form of acoustic or light waves, such as those generated during radio-wave and infra-red data communications.

Computing device 600 also includes data communications network interface 618 coupled to bus 602. Network interface 618 may provide a two-way data communication coupling to a wired or wireless network link 620 that is connected to a local, cellular or mobile network 622. For example, network interface 618 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Network interface 618 may send and receive electrical, electromagnetic or optical signals that carry digital data streams representing various types of information.

Network link 620 provides data communication through one or more networks to other data devices. For example, network link 620 may provide a persistent, periodic, or intermittent connection through network 622 to local computing device 624 that is also connected to network 622 or to data communication equipment operated by a network access provider 626 such as, for example, an internet service provider or a cellular network provider. Network access provider 626 in turn may provide data communication connectivity to another data communications network 628 (e.g., the Internet). Networks 622 and 628 both may use electrical, electromagnetic or optical signals that carry digital data streams. The signals through the various networks and the signals on network link 620 and through network interface 618, which carry the digital data to and from computing device 600, are example forms of transmission media. Computing device 600 may send messages and receives data, including program code, through the networks 622 and 628, network link 620 and network interface 618. In the Internet example, a remote computing device 630 may transmit a requested code for an application program through network 628, network 622 and network interface 618. The received code may be executed by processor 604 as it is received, or stored in storage device 610, or other non-volatile storage for later execution.

CONCLUSION

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like are used in the foregoing specification and in the appended claims in an open-ended fashion, and do not exclude additional elements, features, acts, or operations.

Unless the context clearly indicates otherwise, conjunctive language such as the phrase "at least one of X, Y and Z," is to be understood to convey that an item, term, etc. may be either X, Y or Z, or a combination thereof. Thus, such conjunctive language is not intended to imply that certain embodiments require at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   providing, in a target application, a graphical user interface control for performing a clipboard-to-file paste operation of a non-file content item represented in buffered-content-data in an operating-system-provided buffer of a personal computing device;
   responsive to activation of the graphical user interface control:
      determining, by the target application, a file format, supported by a content management system, for the non-file content item, and
      causing, by the target application, creation, within the content management system, of a content item stored by the target application, wherein the content item:
         conforms to the file format, wherein the file format is based on metadata contained in the buffered-content-data associated with the non-file content item, and
         contains a version of the non-file content item that is based on data obtained from the buffered-content-data.

2. The method of claim 1, wherein the operating-system-provided buffer is an operating system clipboard.

3. The method of claim 1, wherein causing creation of the content item comprises:
   creating stored data by storing a portion of the buffered-content-data to persistent storage that is local to the personal computing device, wherein the portion of the buffered-content-data contains a version of the non-file content item; and
   calling an upload service to upload data from the stored data to a content management system server that is remote relative to the personal computing device.

4. The method of claim 1 wherein determining the file format comprises determining the file format based on metadata, contained in the buffered-content-data, that is associated with the non-file content item.

5. The method of claim 4 wherein:
   the buffered-content-data includes multiple versions of the non-file content item; and
   the method further comprises:
      from the multiple versions of the non-file content item in the buffered-content-data, determining a most-desired-available version of the non-file content item; and
      wherein determining the file format comprises selecting a file format that corresponds to the most-desired-available version of the non-file content item.

6. The method of claim 5 wherein determining the most-desired-available version of the non-file content item is perform based, at least in part, on a ranked list of file formats.

7. The method of claim 5 wherein determining the most-desired-available version of the non-file content item is performed based, at least in part, on user-specified preferences.

8. The method of claim 1 wherein determining the file format comprises determining the file format based on analysis of data, within the buffered-content-data, that represents the version of the non-file content item.

9. The method of claim 1 further comprising:
determining a file name for the file based on at least one of:
content from the non-file content item, or metadata, in the buffered-content-data, associated with the non-file content item; and
wherein causing creation of the content item includes causing creation of the content item having said file name.

10. The method of claim 1 wherein:
the file format is a first file format;
the content item is a first file; and
the method further comprises, responsive to said activation of the graphical user interface control:
determining, by the target application, a second file format, supported by the content management system, for the non-file content item, wherein the second file format is different than the first file format, and
causing, by the target application, creation, within the content management system, of a second file that:
conforms to the second file format, and
contains a second version of the non-file content item that is based on data obtained from the buffered-content-data.

11. The method of claim 1 wherein:
the non-file content item is a first non-file content item of multiple non-file content items that are represented in the buffered-content-data;
the multiple non-file content items include a second non-file content item; and
the method further comprises, responsive to said activation of the graphical user interface control:
determining, by the target application, a second file format, supported by the content management system, for the second non-file content item; and
the target application causing creation, within the content management system, of a second file that:
conforms to the second file format; and
contains a version of the second non-file content item that is based on data obtained from the buffered-content-data.

12. The method of claim 11 wherein:
the second file format is different than a first file format; and
the second non-file content item is a different type of non-file content item than the first non-file content item.

13. The method of claim 1 wherein:
the non-file content item is a text item;
determining, by the target application, the file format, supported by the content management system, for the non-file content item includes:
analyzing the text item to determine that text qualifies as a link, and
determining the file format to be a shortcut file; and causing creation of the content item comprises causing creation of the shortcut file which, when activated, causes retrieval of content that corresponds to the link.

14. The method of claim 1 further comprising:
receiving a second activation of the graphical user interface control when the operating-system-provided buffer of the personal computing device contains a link to a source copy of an intra-system file that is managed by the content management system;
responsive to the second activation of the graphical user interface control, causing the content management system to:
determine a target location within the content management system;
locate the source copy of the intra-system file based on the link; and
create a target copy of the intra-system file, at the target location, based on the source copy of the intra-system file.

15. The method of claim 1 further comprising, responsive to activation of the graphical user interface control and before causing creation of the content item, displaying, by the target application, one or more manual-intervention interfaces that include one or more controls that enable a user to specify at least one of:
the file format for the content item;
a file name for the content item; or
a target location, within the content management system, in which to create the content item.

16. The method of claim 15 wherein:
the one or more manual-intervention interfaces include controls that enable the user to specify multiple formats for the non-file content item; and
the method further comprises, responsive to the user specifying multiple formats for the non-file content item, the target application causing multiple files to be created in the content management system;
the multiple files include a distinct file for each of the multiple formats specified by the user.

17. A non-transitory computer-readable medium storing instructions of a target application which, when executed by a personal computing device, causes:
providing, in the target application, a graphical user interface control for performing a clipboard-to-file paste operation of a non-file content item represented in buffered-content-data in an operating-system-provided buffer of the personal computing device;
responsive to activation of the graphical user interface control:
determining, by the target application, a file format, supported by a content management system, for the non-file content item, and
causing, by the target application, creation, within the content management system, of a content item stored by the target application, wherein the content item:
conforms to the file format, wherein the file format is based on metadata contained in the buffered-content-data associated with the non-file content item, and
contains a version of the non-file content item that is based on data obtained from the buffered-content-data.

18. The non-transitory computer-readable medium of claim 17, wherein causing creation of the content item comprises:
creating stored data by storing a portion of the buffered-content-data to persistent storage that is local to the personal computing device, wherein the portion of the buffered-content-data contains a version of the non-file content item; and calling an upload service to upload data from the stored data to a content management system server that is remote relative to the personal computing device.

19. The non-transitory computer-readable medium of claim 17 wherein:

determining the file format comprises determining the file format based on metadata, contained in the buffered-content-data, that is associated with the non-file content item;

the buffered-content-data includes multiple versions of the non-file content item;

execution of the target application causes from the multiple versions of the non-file content item in the buffered-content-data, determining a most-desired-available version of the non-file content item; and determining the file format comprises selecting a file format that corresponds to the most-desired-available version of the non-file content item.

20. A system comprising:

one or more processors;

non-transitory computer-readable medium operatively coupled to the one or more processors;

the non-transitory computer-readable medium storing instructions of a target application which, when executed by the one or more processors, causes:

providing, in the target application, a graphical user interface control for performing a clipboard-to-file paste operation of a non-file content item represented in buffered-content-data in an operating-system-provided buffer of a personal computing device;

responsive to activation of the graphical user interface control:

determining, by the target application, a file format, supported by a content management system, for the non-file content item; and causing, by the target application, creation, within the content management system, of a content item stored by the target application, wherein the content item:

conforms to the file format, wherein the file format is based on metadata contained in the buffered-content-data associated with the non-file content item, and contains a version of the non-file content item that is based on data obtained from the buffered-content-data.

* * * * *